(12) United States Patent
Mott

(10) Patent No.: US 7,807,973 B2
(45) Date of Patent: Oct. 5, 2010

(54) PILEUP REJECTION IN AN ENERGY-DISPERSIVE RADIATION SPECTROMETRY SYSTEM

(75) Inventor: Richard B. Mott, Ringoes, NJ (US)

(73) Assignee: Pulsetor, LLC, Ringoes, NJ (US)

( * ) Notice: Subject to any disclaimer, the term of this patent is extended or adjusted under 35 U.S.C. 154(b) by 0 days.

(21) Appl. No.: 12/184,721

(22) Filed: Aug. 1, 2008

(65) Prior Publication Data

US 2010/0027747 A1   Feb. 4, 2010

(51) Int. Cl.
*G06F 19/00* (2006.01)
*H04B 15/00* (2006.01)
*G01T 1/00* (2006.01)

(52) U.S. Cl. .............. 250/362; 250/361 R; 250/370.06; 250/370.09; 702/40; 702/79; 702/190

(58) Field of Classification Search ............. 250/361 R, 250/362, 370.06, 370.09; 702/40, 79
See application file for complete search history.

(56) References Cited

U.S. PATENT DOCUMENTS

| | | | |
|---|---|---|---|
| 3,872,287 A | 3/1975 | Koeman | |
| 4,152,596 A | 5/1979 | Marshall, III | |
| 4,217,496 A | 8/1980 | Daniels et al. | |
| 4,593,198 A | 6/1986 | Pang et al. | |
| 4,612,443 A | 9/1986 | Alcidi | |
| 4,658,216 A * | 4/1987 | Goulding et al. ............. | 327/131 |
| 4,692,626 A | 9/1987 | Westphal | |
| 4,835,703 A | 5/1989 | Arnold et al. | |
| 4,870,282 A | 9/1989 | Lacy | |
| 4,968,889 A | 11/1990 | Hartwell et al. | |
| 5,120,962 A | 6/1992 | Rundt et al. | |
| 5,134,294 A | 7/1992 | Rundt et al. | |
| 5,206,174 A | 4/1993 | Gehrke et al. | |
| 5,210,423 A | 5/1993 | Arseneau | |
| 5,225,682 A | 7/1993 | Britton, Jr. et al. | |
| 5,276,615 A | 1/1994 | Tournier et al. | |

(Continued)

OTHER PUBLICATIONS

Srinivasan, R., "Simulation of CFAR detection algorithms for arbitrary clutter distributions", IEE Proc.-Radar, Sonar Navig., vol. 147, No. 1, Feb. 2000.

(Continued)

*Primary Examiner*—David P Porta
*Assistant Examiner*—Casey Bryant
(74) *Attorney, Agent, or Firm*—Eckert Seamans Cherin & Mellot, LLC; Philip E. Levy, Esquire

(57) ABSTRACT

A method of detecting a pileup in an energy-dispersive radiation spectrometry system, wherein a filter of the system generates a first pulse in response to a preamplifier signal, and wherein the system has one or more fast channels having an energy of full efficiency wherein substantially all photons received having at least the full efficiency energy are detected. The method includes measuring an above threshold time duration of the filter, determining that the fast channels have not made any detections while the first pulse is above the minimum detectable threshold energy of the filter, in response thereto, declaring a pileup if the above threshold time duration exceeds a longest expected pulse duration that is a duration of a second pulse that would be output by the filter in response to a single photon having an energy equal to the energy of full efficiency being received by the system.

20 Claims, 12 Drawing Sheets

U.S. PATENT DOCUMENTS

| | | | |
|---|---|---|---|
| 5,304,808 A | 4/1994 | Odell | |
| 5,349,193 A | 9/1994 | Mott et al. | |
| 5,349,195 A | 9/1994 | Dumont | |
| 5,393,982 A | 2/1995 | Mott et al. | |
| 5,430,406 A | 7/1995 | Kolodziejczyk | |
| 5,684,850 A | 11/1997 | Warburton et al. | |
| 5,774,522 A | 6/1998 | Warburton | |
| 5,808,306 A | 9/1998 | Skillicorn et al. | |
| 5,866,907 A * | 2/1999 | Drukier et al. | 250/366 |
| 5,873,054 A | 2/1999 | Warburton et al. | |
| 6,160,259 A | 12/2000 | Petrillo et al. | |
| 6,177,675 B1 | 1/2001 | Gagnon et al. | |
| 6,215,122 B1 | 4/2001 | Clifford et al. | |
| 6,369,393 B1 | 4/2002 | Jordanov | |
| 6,426,993 B1 | 7/2002 | Satoh | |
| 6,470,285 B1 | 10/2002 | Atwell | |
| 6,522,984 B1 | 2/2003 | Jordanov | |
| 6,525,322 B2 | 2/2003 | Wong et al. | |
| 6,525,323 B1 | 2/2003 | Vesel et al. | |
| 6,576,907 B1 | 6/2003 | Klein et al. | |
| 6,590,957 B1 | 7/2003 | Warburton et al. | |
| 6,901,337 B2 | 5/2005 | Tanaka et al. | |
| 6,936,822 B2 | 8/2005 | Wong et al. | |
| 2002/0060606 A1 | 5/2002 | Andre | |
| 2004/0158440 A1 | 8/2004 | Warburton et al. | |
| 2004/0206909 A1 | 10/2004 | Izumi et al. | |
| 2006/0015290 A1 | 1/2006 | Warburton et al. | |
| 2006/0120508 A1 | 6/2006 | Chen et al. | |
| 2006/0151707 A1 | 7/2006 | Wellnitz et al. | |
| 2006/0180767 A1 | 8/2006 | Ramsden | |
| 2006/0276706 A1* | 12/2006 | Klein et al. | 600/407 |
| 2008/0172206 A1* | 7/2008 | Mott | 702/189 |
| 2009/0032715 A1* | 2/2009 | Mott | 250/363.01 |
| 2009/0033913 A1* | 2/2009 | Mott | 356/51 |
| 2009/0034682 A1* | 2/2009 | Mott | 378/86 |
| 2009/0037126 A1* | 2/2009 | Mott | 702/79 |

OTHER PUBLICATIONS

Newbury, Dale E., X-ray Mapping in the Spectrum Image Mode at Output Count Rates above 100 kHz with the Silicon Drift Detector (SDD), Microsc Microanal 12 (Supp 2), 2006, 2 pp.

Guo, Weijun et al., A study of the real-time deconvolution of digitized waveforms with pulse pile up for digital radiation spectroscopy, Nuclear Instruments and Methods in Physics Research A 544 (2005) pp. 668-678.

* cited by examiner

GENERIC TRAPEZOIDAL FILTER

```
#================================================================
# fast edges uses single sample-to-sample differences at the full
# 100 Mhz sampling rate.  It expects a pattern of trigger,
# monotonically increasing differences, monotonically decreasing
# difference to below threshold.  Anything else is pile-up.
# Its trigger threshold is dynamically adaptive based on the mean
# of the last 16 negative differences.
# It also checks for runs of successive positive differences, and
# if their total adds up to a detectable level it declares an edge.
# That pushes the detection limit down a bit further.
# We avoid false positives on rebounds from negative spikes or
# positive spikes by checking the positive inflection point after
# the edge against the negative inflection point prior to the edge.
#================================================================
def fastpileup(trace,tracestart,calib,debug,Cedges): # 301
    global peaktime,preampRT,tfactor # 302
    global Hflag, Hftrig,Hfbigtrig # 303
    tracelen = len(trace) # 304
    negFIFO = []       # running sum of 16 negative diffs # 305
    fastpileups = []   # return pileup list for checking     # 306
    edges = []         # left edge at beginning of array # 307
    i = 0 # 308
    j = 1                      # use successive samples # 309
    sumneg = -calib    # init to 1/16 of calib (370 eV) # 310
    for k in range(16): # 311
        negFIFO.append(calib / -16) # 312
    FIFOindex = 0 # 313
    lastdiff  = 0  # 314
    maxdiff   = 0  # 315
    goingup   = 0  # 316
    goingdown = 0  # 317
    pileup    = 0  # 318
    xraydone  = 0  # 319
    diff      = 0  # 320
    posrun = 0 # 321
    negrun = 0 # 322
    clearpos = 0 # 323
    clearneg = 0 # 324
    neginhibit = 0 # 325
    neginf = trace[i] # 326
    lastneginf = neginf    # trace values at local maxima # 327
```

```
while j < tracelen:      # do the rest of the trace  # 328
        lastval = trace[i] # 329
        lastdiff = diff  # 330
        diff = trace[j]-lastval  # 331
        meanneg = sumneg /-16     # all negative, switch sign  # 332
        trig = meanneg * tfactor   # trigger and ending level  # 333
        bigtrig = (5 * trig) / 4   # two step-trigger level  # 334
        if Hflag:  # 335
            trig = Hftrig            # use hardware settings  # 336
        bigtrig = Hfbigtrig    # in DPPsim run-time args  # 337
#   manage local extrema in this section.  Edges are
#   validated at the end of a negative run (positive
#   curvature, local minimum). We expect the positive
#   run to be bigger than bigtrig, and the difference
#   between this local minimum and the last local
#   maximum before the X-ray edge to be > trig/2.
        if clearpos:  # 338
            posrun = 0  # 339
            clearpos = 0  # 340
        if clearneg:  # 341
          negrun = 0  # 342
            clearneg = 0  # 343
        if diff > -trig/8:  # shift comparator slightly neg  # 344
            if not posrun:   # at a local minimum?  # 345
                prj = j   # save start, maybe weak trigger  # 346
            if xraydone:    # do we have one to verify?  # 347
                    xraydone = 0  # 348
                    neginhibit = 10   # 100 nS, skip overshoot  # 349
                    if lastval-lastneginf > trig/2:   # 350
                        edges.appen d(jmd)            # got one!  # 351
            posrun = posrun + diff  # height of positive run  # 352
            clearneg = 1  # 353
        else:               # run, allowing for some noise  # 354
            if not negrun:  # at a local maximum?   # 355
              lastneginf = neginf  # 356
                neginf = lastval  # keep last 2 local maxima   # 357
            negrun = negrun + diff  # depth of negative run  # 358
            clearpos = 1   # strong neg, clear on next cycle  # 359
```

```
# manage close pileup detection in this section.  The pattern
# we look for is slowdown in rate of rise below trig level,
# followed by an unexpected increase in rate of rise above trig
# Note for FPGA code: anything which triggers this (is appended
# to fastpileups list) can be discarded with no further DSP action.
        if goingdown: # 360
            if diff < trig: # 361
                goingdown = 0 # 362
                xraydone = 1   # end of pulse,we're done # 363
            elif diff > lastdiff + trig: # 364
                fastpileups.append(jmd) # back up is pileup # 365
                edges.append(jmd)  # claim it as an edge # 366
                jmd = j            # new maxdiff index # 367
                goingdown = 0 # 368
                goingup = 1 # and put us back in goingup state # 369
        elif goingup: # 370
            if  diff > maxdiff: # 371
                maxdiff = diff   # still rising? # 372
                jmd = j          # index of max diff so far # 373
            elif diff < trig/2:  # don't go through goingdown # 374
                goingup = 0 # 375
                xraydone = 1       # go direct to verification # 376
            elif (diff + trig) < maxdiff: # 377
                # slowing down more than noise?
                goingup = 0 # 378
                goingdown = 1   # enable fast pileup check # 379
            else: # 380
                pass  # change within noise range, continue # 381
        elif diff > trig and trace[j] > neginf: # 382
            # single-difference trigger?
            # must also be > last local maximum
            goingup = 1   # init detect sequence # 383
            jmd = j # 384
            maxdiff = diff # 385
        elif posrun > bigtrig and not xraydone: # 386
            # slow (weak) trigger only?
            goingup = 1         # init detect sequence # 387
            jmd = (j + prj + 1)/2 # 388
            # assume center of run, rounded
            maxdiff = trig # 389
            # inhibit fast pileup check unless we
            # exceed trigger level
```

```
        elif diff < -10*trig:  # 390
                # not trailing overshoot, reset detection
                neginhibit = 10  # 391
                i = i + resetinhibit  # 392
                j = j + resetinhibit  # 393
        lastdiff = 0  # 394
                posrun = 0  # 395
                goingup = 0  # 396
                goingdown = 0  # 397
                negrun = 0  # 398
                clearpos = 0  # 399
                clearneg = 0  # 400 if i < tracelen:  # 401
                        neginf = trace[i]  # 402
                lastneginf = neginf  # 403
                # init trace values for saving local maxima
        active = goingup or goingdown or xraydone  # 404
        # skip X-ray edges
        if diff<0 and diff>-bigtrig:  # 405
                if not active and not neginhibit:  # 406
                        # keep running sum of neg diffs, but avoid large values
                        sumneg = sumneg + diff -negFIFO[FIFOindex]  # 407
                        negFIFO[FIFOindex] = diff  # 408
                        if FIFOindex < 15:  # 409
                            FIFOindex = FIFOindex + 1  # 410
                        else:  # 411
                            FIFOindex = 0        # ring buffer structure  # 412
        elif neginhibit:  # 413
                neginhibit = neginhibit-1  # 414
                # timer to avoid trailing overshoot i = i + 1  # 415
        j = j + 1  # 416 return (edges)  # 417
```

*FIG.3D*

PILEUP METHOD
POSITIVE/NEGATIVE RUNS

| STATE | ACTIONS |
|---|---|
| POS | posrun = posrun + diff |
| CLR NEG → POS | lastneginf = neginf<br>neginf = lastval |
| NEG | —— |
| CLR NEG | posrun = diff |
| VALID EDGE | xraydone = 0<br>if lastval > lastneginf + trig/2 → set event |

PILEUP REJECTION IN AN ENERGY-DISPERSIVE RADIATION SPECTROMETRY SYSTEM

FIELD OF THE INVENTION

The present invention relates to energy-dispersive radiation spectrometry systems, such as X-ray spectrometry systems or gamma-ray spectrometry systems, and in particular to a method for improving pileup rejection in an energy-dispersive radiation spectrometry system.

BACKGROUND OF THE INVENTION

Energy-dispersive radiation spectrometry systems, such as, without limitation, X-ray spectrometry systems or gamma-ray spectrometry systems, are used for detecting, measuring and analyzing radiation emissions, such as X-ray emissions or gamma-ray emissions, from, for example, a scanning electron microscope (SEM). A typical energy-dispersive radiation spectrometry system includes the following four main components: (1) a detector, (2) a pre-amplifier, (3) a pulse processor, and (4) a computer-based analyzer. For convenience only, and not for purposes of limitation, the following description will relate to X-ray spectrometry systems and photons in the form of X-rays (as compared to, for example, photons in the form of gamma-rays that are detected in a gamma-ray spectrometry system).

The detector, which usually takes the form of a semiconductor sensor of some type, converts an incoming X-ray into a very small current pulse, typically on the order of tens of thousands of electrons, with a duration of about tens to a few hundreds of nanoseconds. The magnitude of each of the current pulses is proportional to the energy of the X-ray.

The pre-amplifier amplifies the current pulse output by the detector and typically converts it into a voltage signal in the range of tenths of millivolts up to a few hundreds of millivolts. There are two main types of preamplifiers: "tail pulse" or RC-coupled preamplifiers, and pulsed-reset preamplifiers. The subject matter described elsewhere herein applies to both types of preamplifiers.

In a pulsed-reset type of preamplifier, the charge generated in the sensor is integrated in a feedback capacitor such that the resulting voltage increases in steps of varying heights and intervals, until it reaches an upper limit. When that limit is reached, a "reset" pulse is applied which drains the accumulated charge from the feedback capacitor, restoring the preamplifier to near its minimum output voltage in a short time, typically a few microseconds. Then, charge due to the interaction of X-rays with the detector accumulates on the feedback capacitor again, and the cycle repeats. In contrast, tail-pulse preamplifiers act as high-pass filters on the voltage step signal output by the detector, with an exponential return to baseline whose time constant is long compared to the charge integration time in a feedback capacitor of the preamplifier.

The pulse processor receives the pre-amplifier signal and generates a numeric representation of the X-ray's energy through an integration process. In older energy-dispersive radiation spectrometry systems, the pulse processor included two separate components, namely a "shaping amplifier" and an analog to digital converter. Modern energy-dispersive radiation spectrometry systems, on the other hand, typically combine these functions, with the newest designs digitizing the preamplifier signal directly and carrying out all pulse detection and filtering functions using digital signal processing.

The computer-based analyzer accumulates the X-ray energies output by the pulse processor into a spectrum or plot of the number of X-rays detected against their energies. The spectrum is divided into a somewhat arbitrary number of small ranges called "channels" or "bins." In older systems, a hardware component called a multi-channel analyzer (MCA) did the accumulation of X-rays into spectrum channels and a computer read out the summed result. In modern systems, the MCA function is handled in software, either by the computer or even within the pulse processor.

The job of the pulse processor is made more complex by several factors. For example, electronic noise is superimposed on the underlying signal received from the preamplifier. For X-rays that are near the lowest detectable energy level, the preamplifier output step height may be significantly smaller than the peak-to-peak excursions of the electronic noise. In such as case, the X-ray can only be detected by filtering the signal for a relatively long period of time before and after the step, to average away the contribution of the noise. The amount of such noise averaging is a fundamental operating parameter of all pulse processors. This averaging time is variously referred to in the art as "shaping time" or "peaking time."

Second, the steps in the preamplifier output are not instantaneous. In the absence of noise, the signal would be a sigmoidal (S-shaped) curve. This is due to bandwidth limitations, device capacitance, and the time required for all the electrons generated by an X-ray to reach the anode of the sensor. These electrons can be visualized as a small cluster or cloud, which moves through the sensor material toward the anode under the influence of the bias voltage field within the semiconductor sensor. With a tail-pulse preamplifier, the initial rise of the signal is of the same sigmoidal form, followed by an exponential decay whose time constant may vary with the design but is always long compared to the initial rise.

In a traditional detector with simple planar electrodes on each face, called a lithium-drifted silicon or Si(Li) detector, the bias field lines are straight (to a first approximation, ignoring edge effects) and run front-to-back. As a result, the electron cloud collection time is approximately constant, and the "rise time" of the preamplifier signal (the width of the sigmoidal step) is dominated by bandwidth limitations due to the relatively large capacitance of the device.

A new type of sensor has been developed in recent years, known as a Silicon Drift Detector (SDD). Its salient novel characteristic is a concentric pattern etched into the bias electrodes which, when slightly varying voltages are applied to the individual rings in the pattern, permit the bias field inside the sensor material to be shaped such that the electrons are funneled to a very small spot anode. This has the effect of reducing the effective device capacitance by about four orders of magnitude. The electron cloud from an X-ray interaction expands with drift time to a greater or lesser degree depending on the path length it travels to reach the anode. Because of the reduced device capacitance, the cloud integration time contributes much more to the rise time of the preamplifier signal, which in SDDs can vary by about a factor of two, as compared to a few percent in the case of Si(Li) detectors (although even the longer end of the range of the rise time for an SDD may still be faster than a conventional planar-electrode sensor (Si(Li) detector) due to the reduced total capacitance).

A phenomenon known in the art as "pulse pile-up" occurs as a result of successive X-rays arriving too close together to have their energies measured independently. If undetected, only one energy is measured for both X-rays, located somewhere between that of the higher-energy X-ray of the pair and the sum of the two X-ray energies, depending on the details of the pulse shaping filters of the system and the time interval between the X-rays. Thus, pulse processors need to be able to effectively detect the occurrence of pile up, which when detected, will result in the energy measurements associated therewith being discarded (referred to as pile up rejection).

Radiation, whether naturally occurring or induced by some form of excitation, is a random process. No matter how high or low the average emission rate, with some non-zero probability the time interval between two emitted X-rays can be arbitrarily short. The probability of getting a second X-ray within any time interval t is:

$$P=(1-e^{-(rt)})$$

where e is the base of natural logarithms and r is the average X-ray arrival rate.

The minimum time interval between two X-rays which still permits them be identified as distinct events, which is known in the art as the "pulse-pair resolving time", is a strong inverse function of energy. In other words, it is much more difficult to detect near coincidences between small (low energy) pulses than large ones. Because all peak-detecting filters of a pulse processor respond strongly to high-energy X-rays, the most difficult case to detect is a closely following low-energy X-ray.

The traditional method of pile-up detection can generally be described as one or more parallel filters with fixed but very short shaping times compared to the shaping time of the main energy-measurement processing path (referred to as the "main channel"). These are variously called "fast channels" or "pile-up rejection channels". Each channel (main and fast) has a parameter referred to as dead time, which is the amount of time it takes the channel to accurately and unambiguously measure the energy of a single X-ray. Because the fast-channel dead times $D_f$ will be much shorter than the dead time D of the main channel, the fast channels are much more likely to produce distinct pulses for X-rays arriving close together in time. The filters (analog or digital) which are used in the fast channels are generally of the same type used for energy measurement (the main channel), just with much shorter pulse widths.

However, because the fast-channel shaping times are so short, they are not very effective at averaging away electronic noise. The shaping time of any pulse processing channel determines the lowest energy X-ray which can be detected in that channel. If its detection threshold is set any lower, the processing channel will produce excessive false triggers due to the random noise fluctuations in the preamplifier output signal. A state of the art X-ray spectrometry system will typically be able to distinguish X-rays of about 100-200 electron volts (eV) from noise in the main measurement channel, but the threshold energies of the fast channels must be much higher. The fastest pile-up rejection channel, which defines the best pulse-pair resolving time for high-energy X-rays, typically has a threshold between 1000-2000 eV. Some existing pulse processors have as many as three pile-up rejection channels to improve pile-up rejection performance in the range below 1000 eV. In systems with more than one pile-up rejection channel, the intermediate channels will have shaping times chosen to allow sensitivity to particular emission lines such as Oxygen at 525 eV, or Carbon at 277 eV. With each step down in the desired energy detection threshold, the pulse-pair resolving time is degraded by the need for longer shaping time.

The pulse-pair resolving time is dominated by the lower-energy X-ray of the pair. This is important because low-energy pile-up detection failure affects not only low-energy peaks, but all peaks in the spectrum. Undetected pile-up with low-energy X-rays can shift counts out of any peak into a broad shelf extending from its expected position as far as the sum of the two peak energies. A good description of the dependence of pile-up effects on energy may be found in P. J. Statham, *Microchim. Acta* 155, 289-294 (2006).

Furthermore, the highly variable rise time for valid single X-ray pulses in the case of SDDs, depending on how far from the charge-collection anode the X-ray is absorbed, poses the biggest challenge for traditional methods of detecting very close coincidence in time, when even the fastest conventional pile-up channel produces only a single output pulse. The classic technique, as described in, for example, U.S. Pat. No. 5,684,850 to Warburton et al., is a pulse-width test. Digital triangle or trapezoidal filters are most popular for all-digital pulse processing systems, because they are relatively easy to construct and computationally efficient. There is also what is known in the art as Finite Impulse Response (FIR) filters, meaning the response of the filter is guaranteed to be zero outside a finite range of time defined by extent of the filter's non-zero weighting coefficients. In contrast, traditional semi-Gaussian analog pulse shaping introduces exponential time constants whose response in principle continues forever, although in practice the output decays below the noise threshold in a reasonably predictable (albeit slightly energy-dependent) time.

The pulse width of FIR filters is not energy-dependent even in principle, but it is dependent on the rise time of the preamplifier step, which is in turn dependent on the variable charge collection time in the SDD. Thus, in order to avoid false rejection of valid pulses from single X-rays, a fixed pulse-width test must be set long enough to accept the maximum rise time resulting from the longest drift path length in the SDD.

It would thus be advantageous to have a pile up detection method that is not dependent on rise time, as such a method would improve the performance of systems employing SDDs wherein rise times are highly variable.

SUMMARY OF THE INVENTION

In one embodiment, a method of detecting a pileup from an output signal of a preamplifier of an energy-dispersive radiation spectrometry system, such as an X-ray spectrometry system or a gamma-ray spectrometry system, wherein a filter of the energy-dispersive radiation spectrometry system generates a first pulse in response to the output signal, and wherein the energy-dispersive radiation spectrometry system has one or more fast channels, wherein each of the fast channels has an associated energy of full efficiency that depends on a threshold energy associated with the fast channel wherein substantially all photons received by the energy-dispersive radiation spectrometry system having at least the associated energy of full efficiency are detected by the fast channel. The method includes measuring an above threshold time duration which is a time during which the first pulse is above a minimum detectable threshold energy of the filter, determining that at least one of the one or more fast channels has not made any detections while the first pulse is above the minimum detectable threshold energy of the filter, in response to the determining, declaring a pileup if the above threshold time duration exceeds a longest expected pulse duration, wherein the longest expected pulse duration is a duration of a second pulse that would be output by the filter in response to a single photon being received by the energy-dispersive radiation spectrometry system, wherein said single photon has an energy equal to the associated energy of full efficiency of the particular one of the one or more fast channels which have not made any detections that has the lowest threshold energy. In one particular embodiment, the one or more fast channels comprise a plurality of fast channels.

In another embodiment, a pulse processor is provided that is adapted to perform the method just described. In still another embodiment, an energy-dispersive radiation spectrometry system, such as an X-ray spectrometry system or a gamma-ray spectrometry system, is provided that includes a detector for converting an incoming photon into an output comprising a current pulse, a preamplifier for converting the output of the detector into a preamplifier output signal comprising a voltage signal, and a pulse processor having a filter that generates a first pulse in response to the preamplifier output signal, and one or more fast channels, wherein each of the fast channels has an associated energy of full efficiency that depends on a threshold energy associated with the fast channel wherein substantially all photons received by the energy-dispersive radiation spectrometry system having at least the associated energy of full efficiency are detected by the fast channel. The pulse processor is adapted to measure an above threshold time duration which is a time during which the first pulse is above a minimum detectable threshold energy of the filter, determine that at least one of the one or more fast channels has not made any detections while the first pulse is above the minimum detectable threshold energy of the filter, and in response to determining that the one or more fast channels have not made any detections, declare a pileup if the above threshold time duration exceeds a longest expected pulse duration, the longest expected pulse duration being a duration of a second pulse that would be output by the filter in response to a single photon being received by the energy-dispersive radiation spectrometry system, wherein said single photon has an energy equal to the associated energy of full efficiency of the particular one of the one or more fast channels which have not made any detections that has the lowest threshold energy.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 3A-3D includes source code which may be used to implement the invention according to one particular non-limiting embodiment;

DESCRIPTION OF THE PREFERRED EMBODIMENTS

Figure 1:
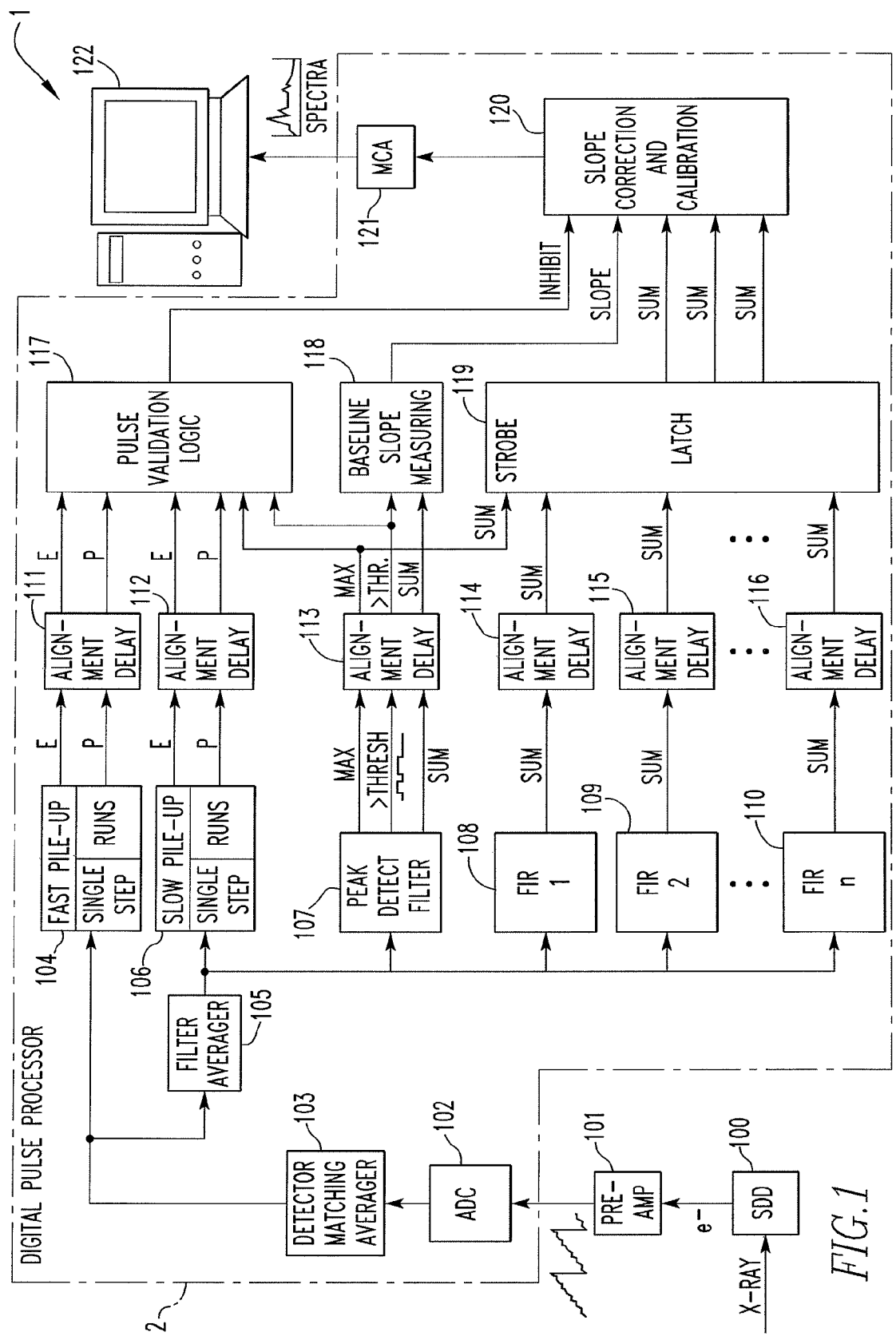
FIG. 1 is an overall block diagram of an X-ray spectroscopy system according to one particular, non-limiting embodiment in which the present invention may be implemented.

As noted in the Background of the Invention, the subject matter described herein applies to both tail pulse and pulsed reset preamplifiers. However, for ease of illustration and description, invention will be described in connection with embodiments that employ a pulsed reset type preamplifier. As discussed in the Background of the Invention, the rising portion of the detector voltage step signal is passed through a tail pulse type preamplifier relatively unchanged. As a result, it will be appreciated from the description for the pulsed-reset embodiment that the invention described herein may readily be applied to a tail pulse preamplifier embodiment. In addition, the subject matter described herein applies to energy-dispersive radiation spectrometry systems generally. However, for ease of illustration and description, the invention will be described in connection with embodiments that employ an X-ray spectrometry system. This is not to be considered to be limiting, and it is to be understood that the invention may be applied in connection with other types of energy-dispersive radiation spectrometry systems, such as, without limitation, gamma-ray spectrometry systems.

The improvements described herein do not depend on rise time, but rather, in one embodiment, only on the expected sigmoidal pattern of charge collection in the detector, and in another embodiment, on having a monotonically (within a noise-dependent limit) rising signal followed by a brief period where random noise determines the direction (sign of the local first derivative, rising or falling) of the signal. Thus, improvements described herein can respond faster to X-ray steps with short rise times, and appropriately more slowly to pulses with longer rise times without falsely rejecting the latter. In one embodiment, an assumption which is made is that the voltage signal from a valid single X-ray should have a monotonically increasing first derivative (within the limits of noise) up to some maximum, followed by a monotonic decrease. As described in greater detail herein, the disclosed method according to one embodiment digitizes the preamplifier output directly, and the sequential differences between digitizing ADC samples give the best available estimate of the instantaneous value of the first derivative. In another embodiment, an assumption which is made is that the voltage signal from a valid single X-ray should rise above the local peak-to-peak noise band and then eventually stop rising, and that the noise band should shift significantly before and after the rise, as measured by the local maximum preceding the rise and the local minimum following it. The system in this embodiment digitizes the preamplifier output directly and local extrema are measured in the digitized signal.

The conversion speed of the digitizing ADC should be properly matched to the expected range of rise times. It should be fast enough so that at the shortest expected rise time, the waveform will be sampled several times during the rise. The minimum number of samples within a rise time for the invention to be fully effective is preferably 4 or 5. In a preferred embodiment, the sampling rate of the ADC is 100 MHz for a shortest expected rise time of approximately 50 nS, so that 5 samples occur within the minimum rise time and roughly 10 samples in the longest rise time.

If the sampling rate is too high, such that say 40 or 50 samples fall within the rise time, the waveform will not move enough in a single sampling interval for a rising step to be easily distinguishable from a random noise fluctuation. As described elsewhere herein, this situation is easily handled by dividing down the sampling rate, summing some number of ADC samples for each value presented to the circuitry embodying the invention, to achieve the optimum 4 to 8 samples in the fastest rise.

A main object of an embodiment of the present invention is to reduce the average pulse-pair resolving time for voltage steps generated in the output signal of a semiconductor radiation sensor, by exploiting the smooth sigmoidal nature of the underlying signal, and using an adaptive step-detection method which automatically adjusts itself to variations in the rise time and noise characteristics of the sensor/preamplifier combination. The result is a lower level of undetected pulse pile-up in the energy spectrum and thus a reduction in the relative size of the erroneous artifacts known in the art as "sum peaks" which occur at twice the energy of, or the summed energies of any two, large emission peaks in the spectrum.

The method described herein is digitally based, and requires the preamplifier signal to be digitized by an analog-to-digital converter (ADC). The optimum conversion rate is dependent on the fastest rise time expected from the preamplifier, as described above.

The description which follows assumes a positive-going preamplifier output when X-rays are detected, but it will be appreciated by those of skill in the art that the polarity of the signals could be reversed throughout the signal chain and the method would be equally effective. It also assumes a Silicon-based sensor and radiation in the low X-ray energy range, but again it will be appreciated by those of skill in the art that the method described applies to sensors made of other semiconductors such as Germanium, and to photons of higher-energy X-rays or Gamma rays.

FIG. 1 is an overall block diagram of an X-ray spectroscopy system 1 according to one particular embodiment in which the present invention may be implemented. As seen in FIG. 1, the X-ray spectroscopy system 1 includes as a main component thereof a digital pulse processor (DPP) 2, shown by a dotted line boundary, in which the present invention is implemented as described herein. In addition, the X-ray spectroscopy system 1 further includes a silicon drift detector (SDD) 100 and a pulsed reset-type preamplifier 101.

In operation, an X-ray strikes the SDD 100 and is converted into electron-hole pairs, the number of electrons being proportional to the energy of the X-ray. The small charge consisting of the total of these electrons is accumulated on a capacitor in the preamplifier 101 and is converted into an output voltage signal of the form shown, in which small sigmoidal steps occur with varying amplitudes and intervals superimposed on noise. The voltage signal has an overall positive slope due to leakage current in the SDD 100, with periodic resets which drain the charge from the feedback capacitor and force the output quickly to its lower limit, resulting in the sawtooth-like waveform shown in FIG. 1. This general approach has been known in the art for many years.

The output of the preamplifier 101 is digitized by a high-speed Analog-to-Digital Converter (ADC) 102 provided as part of the DPP 2. In a preferred embodiment, the ADC 102 is a 100 Mhz, 16-bit part made by Analog Devices such as the AD9446 series. The present invention was developed using a development board supplied by Analog Devices for this device (Model AD9446-100LVDS/PCB), modified to accept a DC-coupled input signal and connected to an interface board with an on-board memory and a standard USB interface to a PC (Model HSC-ADC-EVALB-DC), to capture thousands of brief (2.62 millisecond) segments of preamplifier waveforms from an SDD mounted on a scanning electron microscope (SEM), adding up to several seconds of real time data stored in disk files. The subsequent digital functions described below were first embodied in post-processing software written in a scripting language called Python. Source code for that software was included in U.S. Provisional Application No. 60/963,320, entitled "IMPROVED EDS PILEUP REJECTION FOR LOW ENERGIES AT HIGH COUNT RATES", filed on Aug. 3, 2007. Selected functions from are reproduced herein. The Python program then served as the specification for a real-time embodiment using a combination of field programmable gate array (FPGA) logic and software written for a Texas Instruments 320C-6414 digital signal processing (DSP) chip. The preferred embodiment, which is shown in FIG. 1, places logic blocks 103 through 119, named and described in greater detail below, in FPGA logic, and logic blocks 120 and 121, also named and described in greater detail below, in DSP chip software.

The output of the ADC 102 consists of digital samples from the preamplifier voltage waveform and a clock which defines the timing for all subsequent blocks in FIG. 1. In order to simplify FIG. 1, the clock is not shown separately, but all function blocks should be understood to be synchronized by the clock of the ADC 102 or some sub-multiple of it as described below.

The output of the ADC 102 and its clock go through a detector matching averager 103, which optionally sums a number of ADC samples and divides the original ADC clock by the same number. The purpose of the detector matching averager 103 is to optimize the effective sampling interval with respect to the rise time of the SDD 100 connected to the DPP 2. Retaining all bits in the sum is preferred in order to avoid quantization errors in the final X-ray spectrum at very short filtering times, so the data paths get wider as processing continues through the DPP 2.

If the average rise time expected from the SDD 100 is less than about 150 nS, the detector matching averager 103 is disabled and the full 100 Mhz rate is used in order to obtain the best possible timing precision. However, if a much slower detector such as the so-called lithium-drifted silicon or Si(Li) detector with planar electrodes is connected to the DPP 2, and the average rise time is several hundreds of nS, it is desirable to reduce the effective sampling rate to that which produces fewer than about 16 samples in the average rise.

The (possibly summed) data and clock from the detector matching averager 103 are passed through two parallel paths. One path leads to fast pile-up logic 104 which has two sub-sections. The first sub-section is referred to as single-step logic, which is the subject of one embodiment and is described in greater detail herein. The other sub-section is referred to as runs logic, which is the subject of another embodiment comprising a digital method based on the length and pattern of monotonic runs of successive data samples, and is also described in greater detail herein. "Monotonic" as used here does not mean strictly monotonic in the mathematical sense. The comparator employed in the method has been offset slightly negative to make detection of positive runs tolerant of a negative sample-to-sample difference if that difference is small compared to the peak-to-peak noise fluctuations. Where the single-step logic is capable of detecting pile-ups within a single continuous rise for moderately high energy X-rays, runs logic is designed to detect the end of a continuous rise due to a low-energy X-ray as quickly as possible within constraints of noise.

The second path leads to a filter averager 105. The filter averager 105 sums a small number of successive ADC samples, preferably 4, to reduce the noise (random fluctuations from sample to sample) and also reduce the speed required in subsequent digital processing steps. The summed-by-4 data and the divided-by-4 clock are passed to slow pile-up logic 106. The slow pile-up logic 106 is functionally identical to the fast pile-up logic 104, but with less noisy and slower data. When operating on the slower sample rate from the filter averager 105, the present invention will not have as good a resolving time, but will reach a lower energy detection threshold before false triggering on noise becomes excessive.

Figure 2:
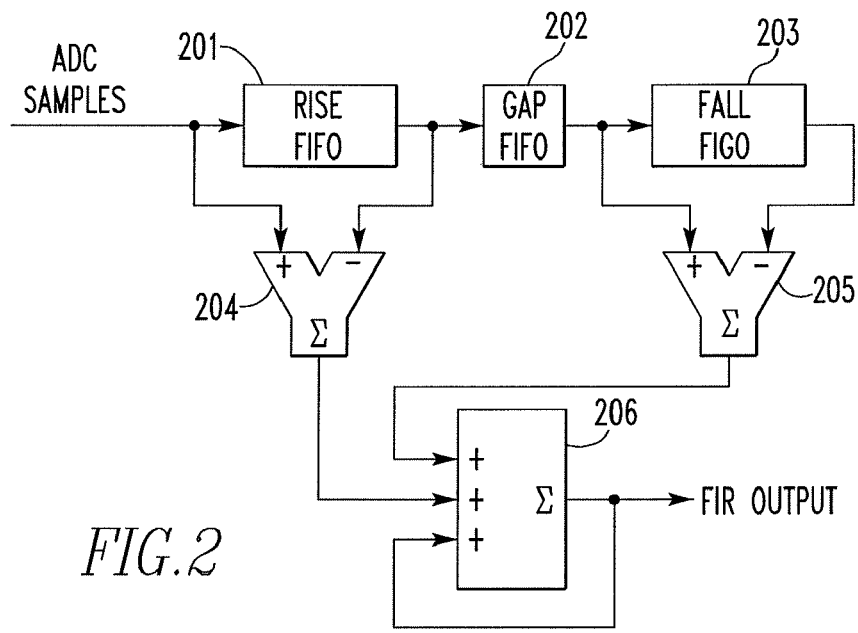
FIG. 2 is a block diagram of a generic trapezoidal FIR digital filter.

The output from the filter averager 105 is also passed in parallel to a peak detect filter 107, and a plurality of trapezoidal FIR digital filters 108, 109, 110. All of these filters are of the conventional trapezoidal type, as has been commonly used in the art for at least 15 years. A block diagram of a generic trapezoidal FIR digital filter is shown in FIG. 2. As seen in FIG. 2, the ADC samples pass through three variable-length FIFOs, referred to as the rise FIFO 201, the gap FIFO 202 and the fall FIFO 203. The rise FIFO 201 is the initial integration time of the FIR filter. When convolved with a step edge, it gives a linear rise in the final FIR sum as the edge passes through the FIFO (ignoring noise fluctuations). The gap FIFO 202 is a period of zero weighting which provides a "flat top" to what would otherwise be a triangle-shaped response to a step edge. A flat top is desirable because, if the rise time of the detector is variable, a pure triangle pulse shape (no gap) would have different maximum outputs for noise-free step edges of the same height but different rise times. If the gap is long enough to cover the longest expected rise time, the maximum output sum will be the same (ignoring noise and any background slope in the input signal). The fall FIFO 203 integrates samples over the same period as the rise FIFO 201 but with the opposite polarity, so that any sample which is added to the overall sum N times in rise FIFO 201 is eventually subtracted from it N times in the fall FIFO 203, where N is the length of the two FIFOs.

Triangle (or trapezoidal) filter shapes are popular because of the simple circuitry required to compute them. Only four computations are required per FIFO clock cycle for an FIR filter of arbitrary total length. The samples entering and leaving the rise FIFO 201 are added and subtracted, respectively, to the running sum. The samples entering and leaving the fall FIFO 203 are subtracted and added, respectively, to the running sum. The first difference is computed in arithmetic logic unit (ALU) 204, and the second in ALU 205. The outputs of those two ALUs are added to the previous overall FIR output in accumulator 206.

The maximum of the FIR output sum will occur while the sigmoidal rise of the input signal is entirely contained within the gap FIFO 202, and is proportional to the energy of the X-ray causing the rise.

The peak detect filter 107 is not concerned with measuring the X-ray's energy, but with detecting all X-rays, even those of very low energy, and locating them as accurately as possible in time. The width of its rise and fall FIFOs is made as short as possible while still reliably detecting the lowest-energy X-ray emission line in the spectrum being collected. For X-ray analyzers mounted on electron microscopes, that is often the carbon emission line at 277 electron volts (eV). Hence the peak detect filter 107 is often referred to as the "carbon filter" in U.S. Provisional Application No. 60/963, 320, entitled "IMPROVED EDS PILEUP REJECTION FOR LOW ENERGIES AT HIGH COUNT RATES", filed on Aug. 3, 2007 identified above. The minimum target emission line may be lower in energy (boron or beryllium), or higher in the case of detectors for X-ray fluorescence (XRF) excitation, which is very inefficient at low energies. XRF detectors are usually equipped with beryllium windows in front of the sensor, which block essentially all X-rays below about 700 eV. In that case, the peak detecting filter 107 can be made narrower without fear of missing significant numbers of X-rays, which improves its performance for pile-up detection.

The peak detecting filter 107 generates the usual FIR sum and two other signals: a pulse at the time of maximum response, and a logic signal indicating when its response exceeds a threshold energy. The detailed use of those signals will be described later.

The FIR filters 108, 109, 110, which are for measuring X-ray energy levels, the peak detect filter 107, the slow pile-up logic 106 and the fast pile-up logic 105 are all connected to appropriately sized programmable-length alignment delay FIFOs 111, 112, 113, 114, 115, 116 such that for a noise-free single X-ray pulse of sufficient energy to trigger all edge (event) detectors, the edge (event) locations (times) from the fast and slow pile-up logic 104, 106, the maximum of the peak detect filter 107, and the output data corresponding to the center of the gap for all energy-measuring FIR filters 108, 109, 110 will arrive at pulse validation logic 117, baseline slope measuring logic 118 and filter latch logic 119 at the same time (within the time quantization limit imposed by the clock division of the filter averager 105).

The filter latch logic 119 grabs the outputs of all FIR filters which correspond to the aligned maximum-output time of the peak detect filter 107. It is the functional equivalent of the sample-and-hold circuit of classical analog pulse processing. Its outputs are delayed by an additional period corresponding to half the FIR pulse width (fall time plus half the gap time) of the longest FIR filter in the energy-measurement filter stack, to allow time for detection of pile-ups following the edge which triggered the latch.

The filter latch logic 119 also contains timers to measure the time from the current strobe signal to the preceding and following strobe signals (maximum-output pulses from peak detect filter 107), in order to allow selection of the longest filter in the FIR stack (if any) which can be used without pile-up according to the methods disclosed in U.S. Pat. No. 3,872,287 to Koeman and U.S. Pat. No. 5,393,982 to Mott. The outputs of all filters shorter than this maximum may also be combined with differing weights to achieve a better estimate of the X-ray's energy, again according to the method taught in U.S. Pat. No. 3,872,287 to Koeman.

The baseline slope measuring logic 118 measures the positive slope due to leakage current of the voltage signal of the preamplifier 101 in the absence of a sigmoidal step due to an X-ray's arrival. It is well-known in the art that trapezoidal FIR filters have a constant response to a linear slope which depends on the width of the filter's integration time and gap. This slope response must be subtracted from the filter's output to obtain an accurate measure of the X-ray's energy. The details of a preferred method for estimating the slope near the sigmoidal step are described in U.S. Provisional Application No. 60/963,312, entitled "DIGITAL PULSE PROCESSOR SLOPE CORRECTION", filed Aug. 3, 2007, the disclosure of which is incorporated herein by reference.

The pulse validation logic 117 combines the signals from the fast pile-up logic 104, the slow pile-up 106 and the peak detect filter 107 to determine if a pile-up has occurred within a single output pulse from peak detect filter 107. If such a pile-up has occurred, which will not be detected by the filter latch logic 119 because only one maximum output pulse will be generated by the peak detect filter 107, an inhibit pulse is generated and appropriately delayed to arrive at the same time the output of filter latch logic 119 reaches slope correction and calibration logic 120.

The following tests are performed in the pulse validation logic 117. If a direct pile-up detected pulse is received from either the fast pile-up logic 105 or the slow pile-up logic 106 while the "above threshold" logic signal from the peak detect filter 107 is active, a pile-up is declared and the inhibit signal is generated. If two or more edge-detected pulses are received from either the fast pile-up logic 105 or the slow pile-up logic 106 while the "above threshold" logic signal is active, a pile-up is also declared and the inhibit signal is generated.

Edge-detected signals and pile-up detected signals generated from the fast pile-up logic 105 or the slow pile-up logic 106 when the "above threshold" signal is not active are ignored as false triggers. This prevents counting false triggers due to brief noise spikes which are averaged away to less than the energy threshold in the peak detecting filter 107, and allows the two pile-up logic blocks to have lower detection thresholds than might otherwise be necessary.

The pulse width and pulse symmetry of the output from the peak detect filter 107 are also tested as disclosed in U.S. Pat. No. 5,349,193 to Mott to detect pile-up if one or both of the X-rays is too low in energy to trigger the fast pile-up logic 105 or the slow pile-up logic 106.

An additional symmetry-like test is performed which checks whether edges detected in the fast pile-up logic 104 and the slow pile-up logic 106 are centered in the time above threshold of the peak detect filter 107. In the software-based implementation described elsewhere herein, this is done by taking an absolute difference in time of the edge positions reported by the fast pile-up logic 104 and the slow pile-up logic 106 and the maximum response of the peak detect filter 107, which for a single X-ray is expected to be centered in the time above threshold. However, it is more convenient in the FPGA logic implementation shown in FIG. 1 to use timers as shown in FIG. 5b instead of an absolute difference of time stamps. These timers will be referred to as Event Lag timers. One Event Lag timer is started at the beginning of the "above threshold" signal. When an edge signal is received from either the fast pile-up logic 104 or the slow pile-up logic 106, the timer is checked against a limit value computed from the known rise and gap times of the peak detect filter 107, plus half the longest expected rise time of the detector for a single event, plus a small allowance for variations due to noise and time quantization errors. If the timer exceeds this limit, a pile-up with a low-energy X-ray is assumed to have occurred.

A second Event Lag timer is started when any edge is received from the fast pile-up logic 104 or the slow pile-up logic 106, and checked against the same limit when the "above threshold" signal goes low. The two timers are labeled "Event Lag 1" and "Event Lag 2" in FIG. 5b. It will be clear to those of ordinary skill in the art that this pair of timers constrain the edge signals to a range in the center of the time above threshold for the peak detect filter 107. This is functionally equivalent to the software time-stamp method on the assumption that the maximum response of the peak detect filter 107 would normally be near the center of the time above threshold.

Edge detection by any filtering mechanism does not have a sharp cutoff in which all X-rays above a certain value are detected while all X-rays below it are not. Instead, due to random noise fluctuations near the edge, detection efficiency rolls off smoothly from 100% above some energy to zero below some lower energy, as described in P. J. Statham, *Microchim. Acta* 155, 289-294 (2006). FIG. 2 from that publication illustrates the shapes of the detection efficiency curves, although that figure refers to Si(Li) detectors and the constants and energy ranges will be quite different for SDDs. Assume pile-up of two X-rays at the energy where the slow pile-up logic 106 will detect them with 50% probability. Half the time only one of the X-rays will be detected.

Figure 5A:
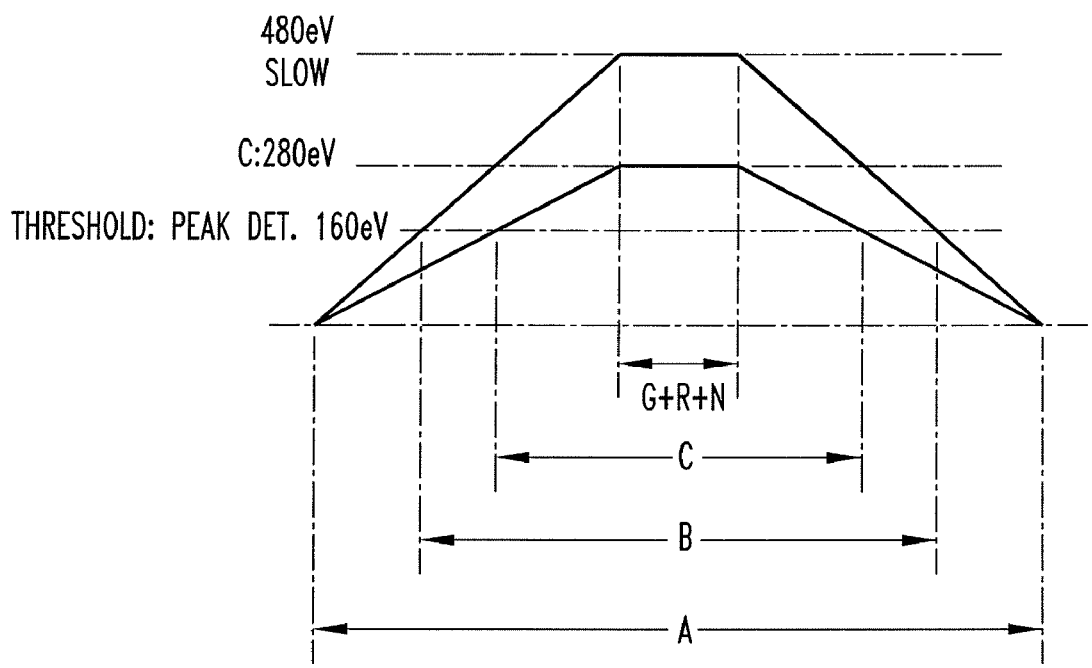
FIG. 5A shows idealized trapezoidal responses from the peak detect filter shown in FIG. 1 to two low-energy X-rays of differing energies, with a third line showing the detection threshold energy.
Figure 5B:
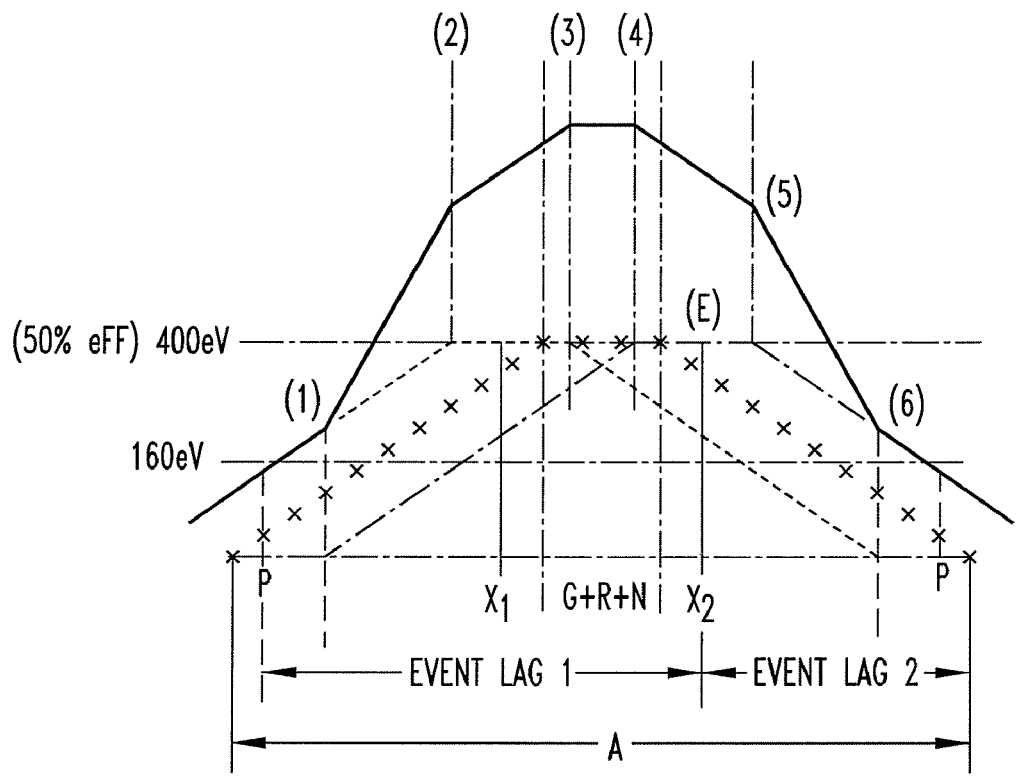
FIG. 5B shows an idealized representation of the output of the peak detect filter shown in FIG. 1 from two X-rays at 400 eV energy.

FIG. 5a shows idealized trapezoidal responses from the peak detect filter 107 to two low-energy X-rays of differing energies, with a third line showing the detection threshold energy. The specified energies in a real application may differ depending on the filter width and the specific SDD/preamplifier being used, but the values given are reasonable for a current-generation SDD.

The upper dashed line, 480 eV, represents the energy above which the slow pile-up logic 106 is nearly 100% efficient. The middle dashed line, 280 eV, is near the Carbon X-ray energy. The lower dashed line, 160 eV, might be a typical setting for the detection threshold and is low enough to detect the element Boron (183 eV).

The center time labeled "G+R+N" is the allowance for the gap time G of the peak detect filter 107, the longest rise time R expected from the detector, and a safety factor N for noise and time quantization errors. This generates a flat region in the filter output. The rising and falling segments of the output are the leading and trailing integration times of the peak detect filter 107.

"High-energy" in the case might mean up to 20 to 30 thousand eV (keV), more than 100 times greater than the detection threshold. The pulse widths B and C shown for 480 eV and 280 eV X-rays respectively will be shorter as shown because the detection threshold becomes an increasingly significant threshold of the X-ray energy below 1 keV.

FIG. 5B shows an idealized representation of the output of the peak detect filter 107 from two X-rays at 400 eV energy. 400 eV is too low to trigger the slow pile-up logic 106 reliably, and a detection efficiency of 50% is assumed at this energy. The trapezoid outlined with crosses shows the response to a single centered X-ray of 400 eV. The dotted and dot-dashed trapezoids show two such X-rays shifted left and right to times X1 and X2 respectively. The total response is the upper solid line, which is always the sum of the dotted and dot-dashed lines. The circled numbers show times where the slope of the output response changes. Because the piled-up X-rays are assumed to be equal in energy, the output shape is symmetrical with its maximum falling somewhere in the narrow flat region between circles 3 and 4. Due to small random noise fluctuations, the actual maximum can be anywhere in this region, so a symmetry check as described in U.S. Pat. No. 5,349,193 may not detect the pile-up.

The pulse in the peak detect filter 107 may pass an overall pulse width check as well. As shown in FIG. 5A, the pulse width for a single low energy X-ray will be reduced compared to maximum width at high energies, and if low energy piled-up events are separated by less than this reduction, the pulse-width test will be ineffective as shown in FIG. 5B (range p-p is less than A). However, as shown in FIG. 5B, one of the timers described above will have the entire pulse separation time added to the average pulse rise time above threshold for a given X-ray. Thus, testing these timers increases the probability of detecting pile-up if only one of the X-rays triggers at least one of the pile-up logic blocks.

A fixed EventLag limit cannot be less than the integration time of the peak detect filter 107 plus the "G+R+N" time described above, or single high-energy X-rays may be falsely rejected as pile-up. The lower the limit, the lower the time separation which is detectable, so it is advantageous to choose an SDD with the fastest possible rise time R and the lowest possible noise N.

A further improvement in pile-up detection can be made if the limits against which the timers are tested is not constant, but varies with energy, since as discussed above and illustrated in FIG. 5A the pulse width of the peak detect filter 107 is lower for low energies. This lower pulse width is predictable from the known detection threshold energy and FIR integration time of the peak detect filter 107, if the X-ray energy is known. Unfortunately, since a pile-up within the pulse time of the peak detect filter 107 is presumed, its maximum output may be proportional to any value up to the sum of the energies of the piled-up X-rays.

However, an upper limit on the energy of all X-rays in the pile-up sequence can be set by realizing that if the fast pile-up logic 105 is not triggered, none of the X-rays may be above the energy where its detection efficiency nears 100%. Similarly if the slow pile-up logic 106 is not triggered, none of the X-rays can exceed the energy where its detection efficiency nears 100%.

In practice, this means setting two different limits for the Event Lag timers and three for the total pulse width: the longest, equal to the fixed limit discussed above, for events triggering at least one fast pile-up 105 edge detection; a middle threshold for events triggering no fast pile-up 105 edge detection, but at least one slow pile-up logic 106 edge detection; and the shortest for pulse-width testing only when no edges are detected by the pile-up logic blocks. The reductions in the limits from the high-energy case are computed from the ratio of the detection threshold energy of the peak detect filter 107 and the 100% detection-efficiency energy of the appropriate pile-up logic block. The expected time above threshold for the rising and falling portions of the FIR response of the peak detect filter 107 for a single X-ray is shortened by the same proportion. In FIG. 5A, the threshold of 160 eV is ⅓ of the 480 eV energy limit above which the slow pile-up logic 106 is expected to detect nearly all X-rays, so the time above threshold for the rising/falling portions of the output is reduced by ⅓. This comparatively large change in expected pulse width with energy near the lowest detectable energies enables detection of closer pile-ups than was possible in the prior art.

In the absence of an edge from the slow pile-up logic 106, the pulse width above threshold should not be greater than interval B given in FIG. 5A, where the expected width of a pulse from a Carbon X-ray is interval C. Therefore, two Carbon X-rays separated by more than (B-C) will be detectable as pile-up. In the prior art, pile-up would not be detected unless the Carbon X-rays were separated by at least (A-C). The same reasoning applies if one X-ray triggers the slow pile-up logic 106 but not the fast pile-up logic 105, although pulse width 'B' will be somewhat wider because the full-efficiency energy limit of the fast pile-up 105 is higher. Also, the EventLag timer limit can be set to the interval from the right edge of the center G+R+N band to the left edge of interval B appropriate for the fast pile-up logic 105 full-efficiency energy limit. Pile-up detection for C X-rays with O X-rays will thus be improved compared to the prior art.

Returning to FIG. 1, the slope correction and calibration logic 120 receives a current slope estimate from the baseline slope measuring logic 118, the outputs of all energy-measuring FIR filters 108, 109, 110, and possibly an inhibit signal from the pulse validation logic 117, all appropriately time aligned. In a preferred embodiment, these functions are implemented in software in a digital signal-processing chip such as the Texas Instruments TMS320C6414, since these events occur at the pulse rate of the peak detect filter 107, which is much lower than the ADC sampling rate.

In the absence of an inhibit signal, this logic subtracts the error due to the baseline slope in the signal from the ADC 102 in a manner well-known in the art, and weights the raw outputs of one or more of the FIR filters 108, 109, 110 to generate a calibrated energy estimate for the X-ray which produced the step edge.

These measured energies are stored in the memory of a multi-channel analyzer (MCA) 121, again in a manner well-known in the art. The spectrum accumulated in the MCA 121 is passed to a host PC 122 for analysis.

Figure 4A:
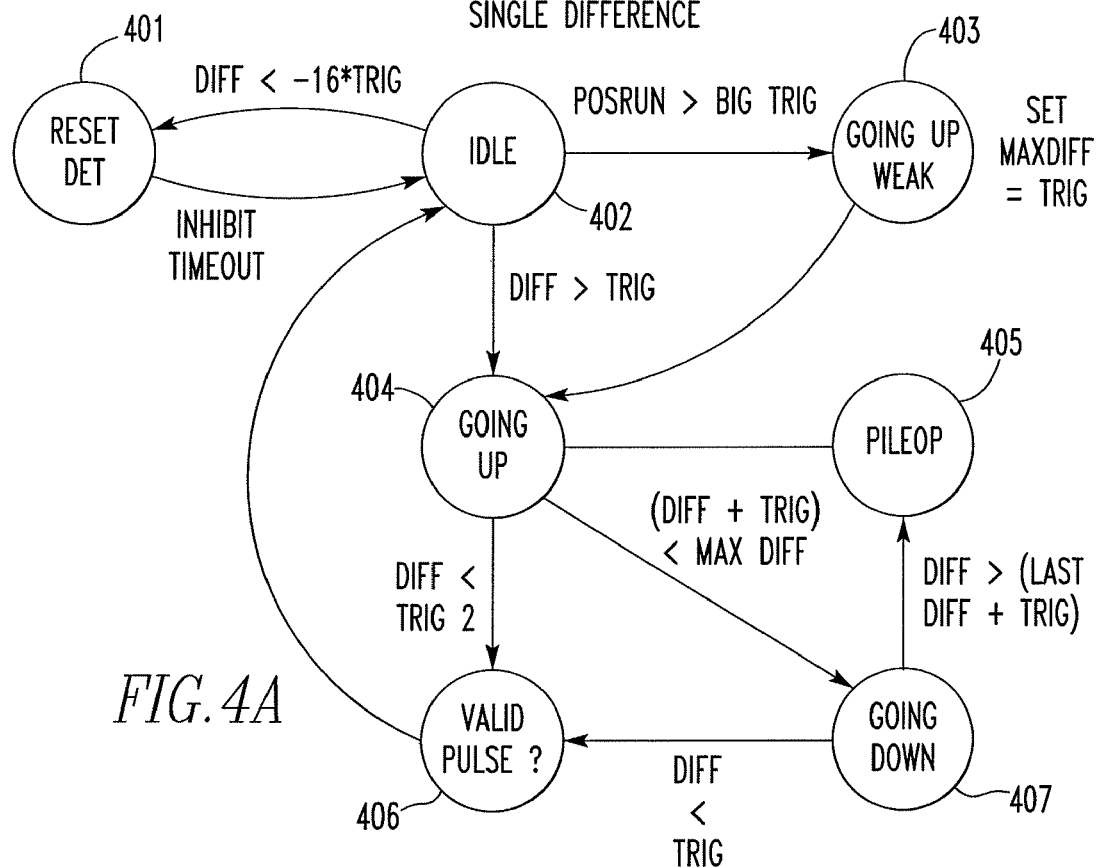
FIGS. 4A and 4B are each a state diagram extracted from the program logic of FIGS. 3A-3D which may be used to design an FPGA embodiment of the invention.
Figure 4B:
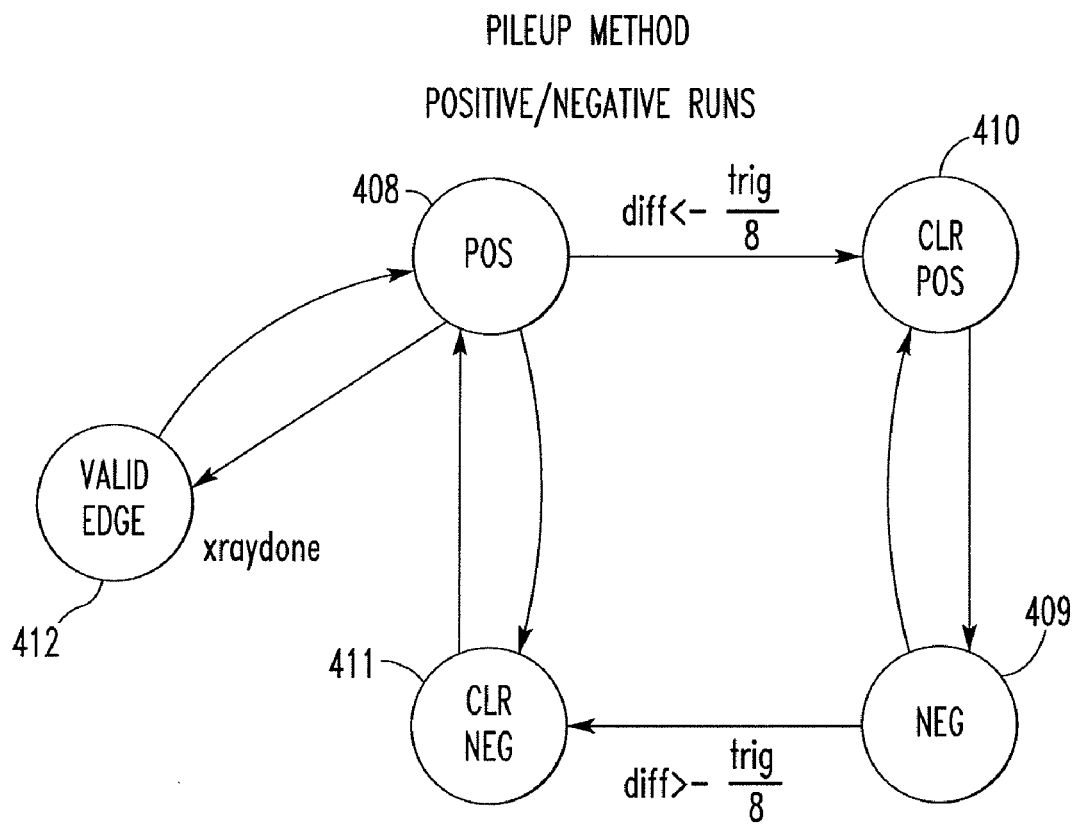
Figure 6A:
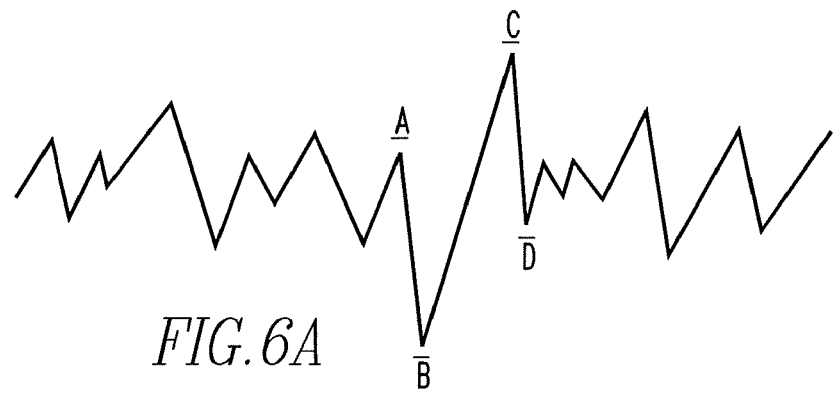
FIGS. 6A, 6B and 6C show three possible patterns of rise and local extrema that may be processed to detect edges using one embodiment of the present invention.
Figure 6B:
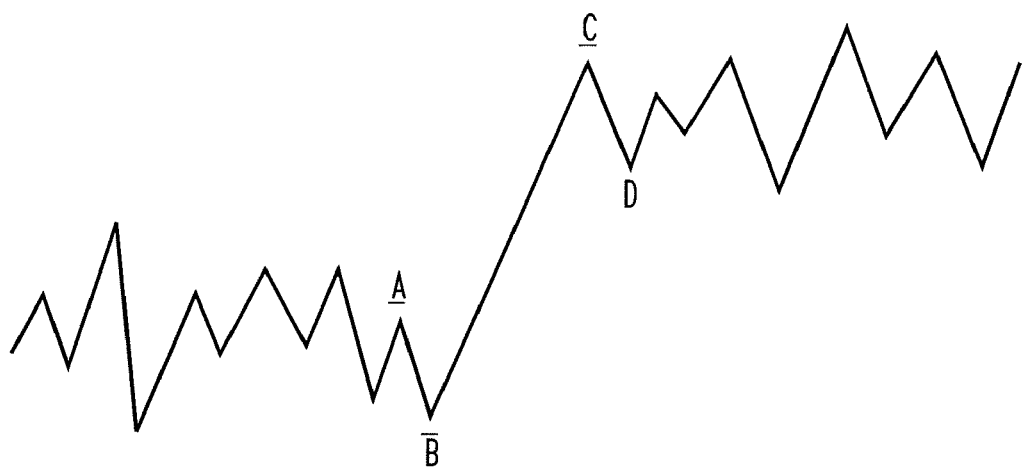
Figure 6C:
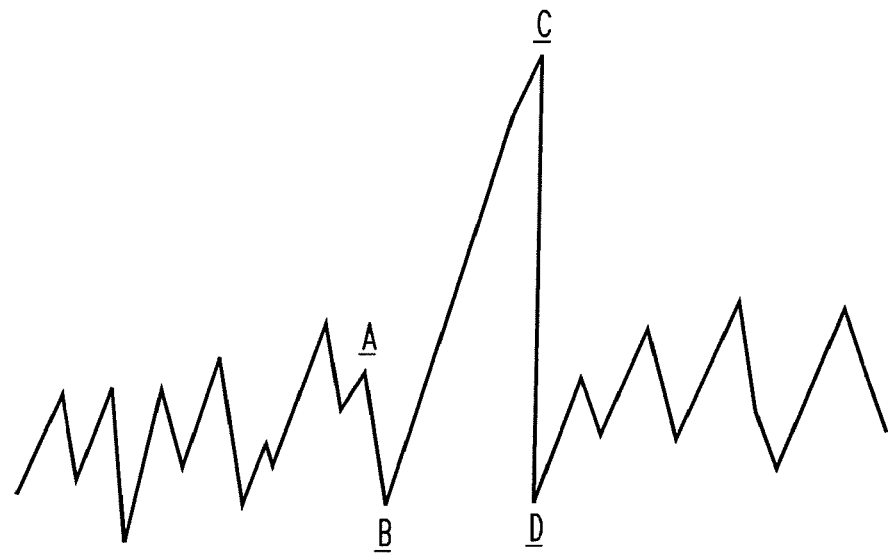
Figure 7A:
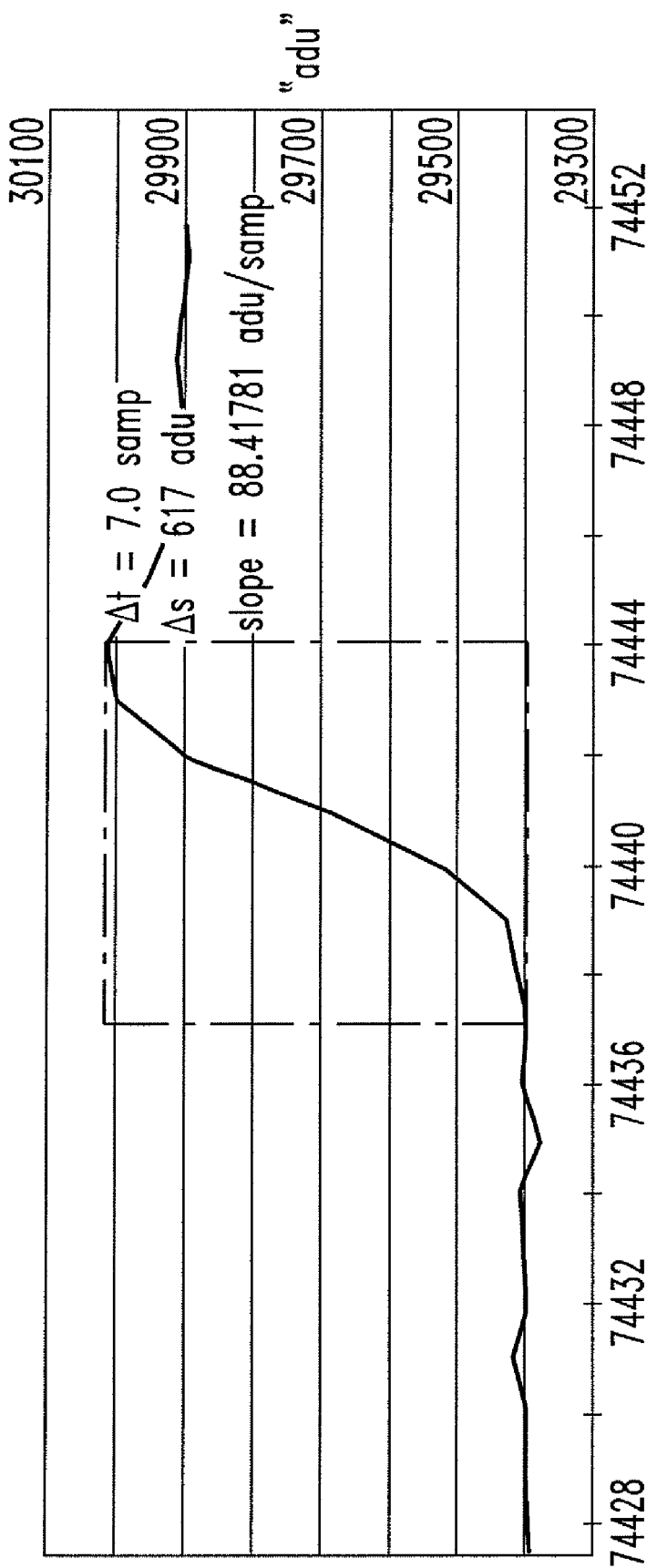
FIGS. 7A and 7B show two plots of actual waveforms from an SDD.
Figure 7B:
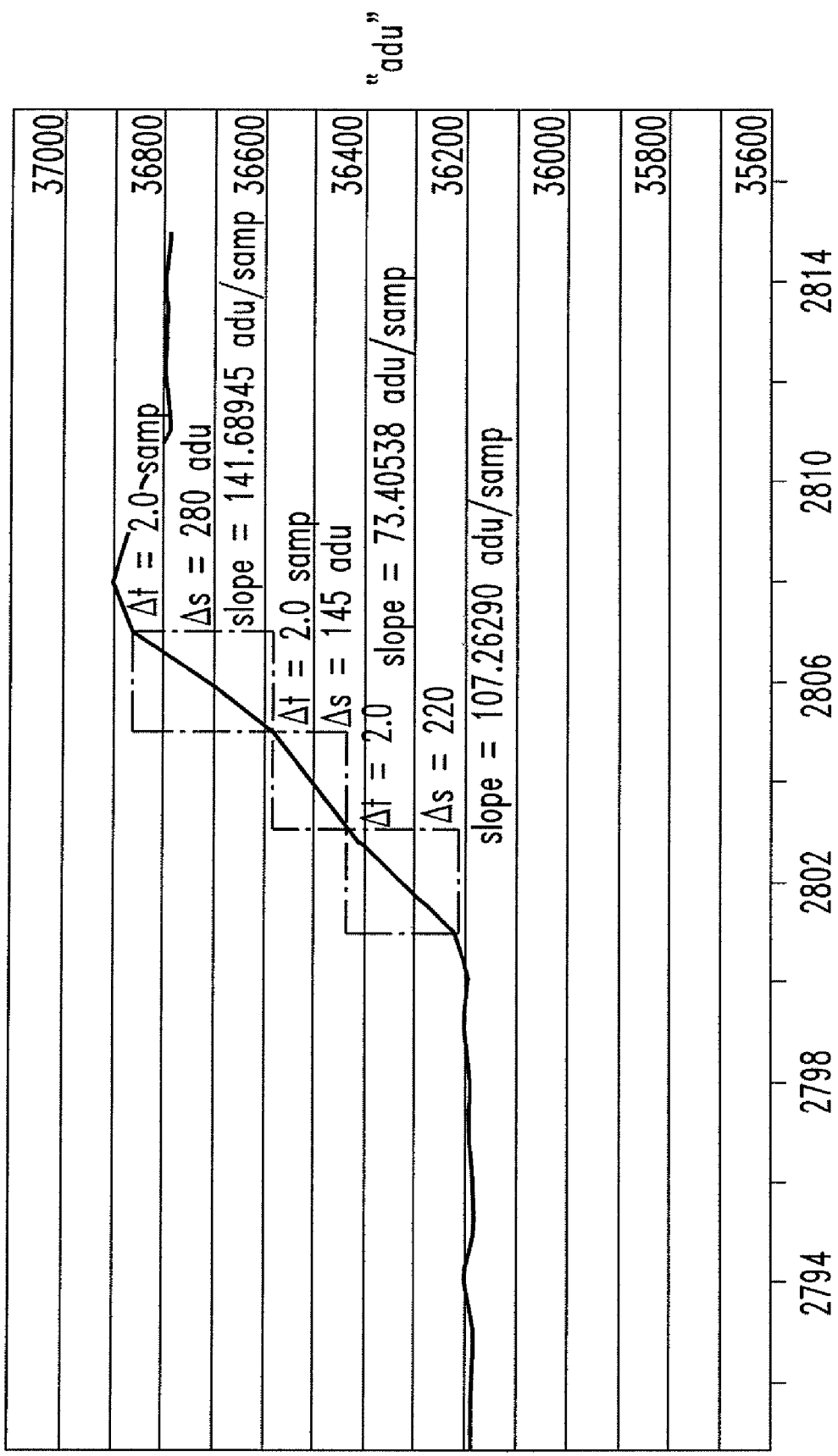

Described in detail herein are parts of the fast pile-up logic 105 and the slow pile-up logic 106 labeled "Single Step" and "Runs" in FIG. 1. "Single Step" is so called because it operates on the successive differences between samples from the ADC 102, possibly averaged as described above in the detector matching averager 103 and the filter averager 104. "Runs" is so called because it tracks positive-going and negative-going runs of samples from the ADC 102, possibly averaged as described above in the detector matching averager 103 and the filter averager 104. FIGS. 3A-3D provide a listing of the program source code for the function which embodies both the "Single Step" and "Runs" portions of the fast pile-up logic 105 and the slow pile-up logic 106 according to one embodiment which, as described elsewhere herein, served as the specification for an FPGA embodiment for the Single Step and Runs methods. FIGS. 4A and 4B are state diagrams extracted from that program logic which was used to design the FPGA embodiment for the Single Step and Runs methods. FIGS. 6A, 6B and 6C show sketches of some possible patterns of rise and local extrema and shows how the present invention, in one embodiment, handles them. Four successive local extrema are labeled 'A', 'B', 'C' and 'D' respectively throughout FIG. 6A-6C. The middle rising run from local minimum 'B' to local maximum 'C' is compared to a trigger level, which in the Python code described herein is the variable "bigtrig". A significant enhancement employed in the preferred embodiment is an additional check between the local minimum following the rise at 'D' and the local maximum preceding it at 'A'. FIGS. 7A and 7B show plots of two pulses in real data captured as described above from an SDD using the same ADC as the preferred embodiment. One of the pulses is a pile-up of two X-rays, one is a single event with similar rise time. These figures are explained in detail below.

Throughout the following discussion, reference will be made to "ADC samples". This should be understood to mean successive data samples presented to the logic under discussion, each of which may be a sum or average of a number of original samples from the ADC 102 according to the settings of the detector matching averager 103 and the filter averager 104.

Certain constants will appear in the code (python code as described elsewhere herein) of FIGS. 3A-3D and the state diagram of FIG. 4 which set the length of FIFOs for averaging noise or measuring baseline slope, the ratios of threshold values for averaged and non-averaged data, and so forth. In the FPGA embodiment (Figure), these constants are programmable register values. Those of ordinary skill in the art will recognize that the specific values used may vary to match a particular detector or detector type without departing from the essential nature of the present invention.

In general, the software operates by taking time differences from the edge locations reported by the three logic blocks: the fast pile-up logic 105, the slow pile-up logic 106 and the peak detect filter 107, referred to in the Python code as the "carbon filter". For the FPGA implementation, it was more convenient to use the above-threshold logic output of the peak detect filter 107 than to do arithmetic on the time stamp associated with its Max signal in order to determine whether an edge reported by the fast pile-up logic 105 or the slow pile-up logic 106 fell inside a pulse from the peak detect filter 107, but those of ordinary skill in the art will recognize that these methods are functionally equivalent.

Python language syntax does not include line numbers. However, the executable (not comment) lines in FIGS. 3A-3D have had line-number comments added at the end for convenience in matching the description below with the code listing. The line numbers start with 301 and end with 417.

A version of the code was provided in U.S. Provisional Application No. 60/963,320, entitled "IMPROVED EDS PILEUP REJECTION FOR LOW ENERGIES AT HIGH COUNT RATES", filed on Aug. 3, 2007. In the code of FIGS. 3A-3d, some comment lines have been dropped or altered as compared to the code in the Provisional Application. Also, some lines of debugging outputs, code which is no longer used, or "dead code" not executed have been removed from the code version included in the Provisional Application to shorten the source listing and improve clarity. The executable code important to the function of the invention that is provided in FIGS. 3A-3D is equivalent to that provided in the Provisional Application.

Comments referring to "inflection points" have been changed to refer to "local maxima/minima" or "local extrema", to conform with correct mathematical usage. The actual operation is clear from the executable code. Such terms as used herein and in the code of FIG. 3A-3D shall samples where the values of successive ADC samples stops increasing and starts decreasing, or stops decreasing and starts increasing.

It should be noted that the entire logic block shown in FIGS. 3A-3d and 4 for the fast pile-up logic 105 is replicated for the slow pile-up logic 106, but at a lower effective ADC sample rate due to the filter averager 104.

In FIG. 3A, line 301 defines the function which implements the invention according to one particular embodiment. The argument "trace" is the incoming data from the ADC 102, which may have been summed down from its original data rate as described above. "Tracestart" is no longer used. "Calib" is an energy calibration factor which is the number of ADC least significant bits (LSBs) in a Mn K-alpha X-ray at 5895 eV. "Debug" is a flag turning on various diagnostic outputs. "Cedges" is an array holding the edges (time stamps) for X-rays detected by the peak detect filter 107, which is referred to throughout the software as the "carbon filter", hence the array name.

Line 302 contains global parameters; only the threshold multiplier "tfactor" is used. Line 302 allows setting of externally fixed values (loaded into registers for the FPGA embodiment (FIG. 1)) for the critical trigger values 'trig' and "bigtrig" discussed below.

Lines 304-328 initialize some variables and arrays. Their meanings will be described as needed when the lines of code in which they are used are described. In particular, the array "fastpileups" will contain the edge locations for pile-ups detected by on embodiment of the present invention. Writing an entry in the "fastpileups" array is equivalent to entering the "PILEUP" state 405 in FIG. 4, and generates a 'P' signal from the fast pile-up logic 105 in the FPGA embodiment (FIG. 1). The array "edges" stores the edge (event) locations equivalent to 'E' signals from the fast pile-up logic 105 in the FPGA embodiment (FIG. 1). In another embodiment described herein, a pile-up signal is not generated directly. Instead, that embodiment generates an 'E' signal for each edge which can be isolated from its neighbors. As described above, if two or more such 'E' signals are received by the Plse validation logic 117 during an "above threshold" pulse from the peak detect filter 107, a pile-up is recognized.

The variable 'trig', set in lines 333 or 336 depending on whether hardware flag "Hflag" is set, is the trigger value for detecting an edge by single ADC sample differences. In line 333, it is set to the average of the last 16 negative-going single-ADC-sample differences times a threshold multiplier "tfactor" set as a global parameter. In the FPGA embodiment, 'trig' is set directly as a register value as in line 336. The variable "bigtrig" (line 334, or line 337 as a register value independent of 'trig' in the FPGA embodiment (FIG. 1)), is a triggering value for the total integral of a continuous run of positive differences between ADC samples, maintained in variable "posrun". As its name implies, "bigtrig" is usually larger than 'trig'.

Line 328 begins the main loop which processes all remaining samples. Two parallel indexing variables 'i' and 'j', separated by 1 as initialized in lines 308-309, select the current pair of ADC samples. The loop ends with lines 415 and 416, which increment these array indexes.

The state variable 'diff', set in line 331 and referenced in most state transitions of FIG. 4, is the single-sample difference between two successive ADC samples (at the time scale defined by any previous averaging) and represents the best available digital estimate of the instantaneous slope of the preamplifier signal (i.e., the signal output by the preamplifier 101 in the FPGA embodiment (FIG. 1)). The previous value of "diff" is maintained in variable "lastdiff", line 330, to check the second derivative (rate of change) of the slope. The second derivative (rate of change) of the slope is expected to be positive (diff>lastdiff) while the signal is rising through the first half of the sigmoid pattern resulting from an X-ray (the "GOING UP" state 404 in FIG. 4A), and then stable or falling (the "GOING DOWN" state 407 in FIG. 4A) for the second half of the sigmoid pattern resulting from an X-ray. The most recent value of the trailing ADC sample of the pair, indexed by "i", is stored in variable "lastval", line 329. This value is used to validate pulses and keep track of points where the slope changes sign, which by definition is a local maximum or minimum.

The loop of FIGS. 3A-3D begins in the "IDLE" state 402 of FIG. 4. Lines 338-359 and 386-389 manage the state transitions of the embodiments described herein, switching between continuous increasing or decreasing runs and making the final determination of an edge as described below.

It will be immediately clear that no matter where the system is operating in the state diagram of FIG. 4A, the signal must alternate between "POS" state 408 and "NEG" state 409 in FIG. 4B (lumping unchanged values into "POS" state 408), and that the transitions between these two states must occur at local maxima for "POS" state 408 to "NEG" state 409 transitions and local minima for the reverse. At those transition points, certain state variables must be maintained for later use, among which are the values of the ADC samples at the current local maximum "neginf" and at the last local maximum "lastneginf".

Lines 338-340, corresponding to state the "CLR POS" state 410, clears the height of the positive run at the start of a negative run. In the version of the code shown in FIGS. 3A-3D, the "CLR POS" state 410 state is passed through on every iteration of the "POS" state 408. This is unnecessary, but harmless. What is important is the transition from the "NEG" state 409 to the "POS" state 408, which tests whether "posrun" is zero to determine whether the processing is at a local minimum and the start of a new positive run, and therefore whether to enter the "VALID EDGE" state 412 if "xraydone" is set. Note that in Python syntax, a value of zero tests false, and any non-zero value tests true for a numeric variable.

Lines 341-343 perform the corresponding function for the "CLR NEG" state 411, clearing the height of the negative run "negrun". The cleared condition of the "negrun" variable is used to flag the transition from the "NEG" state 409 to the "POS" state 408, which identifies a local maximum. The ADC sample values of the previous two local maxima are saved in the variables "neginf" and "lastneginf".

Line 344 is the state test which determines whether the processing is in the "POS" state 408 or the "NEG" state 409. In a preferred embodiment, the comparison limit is slightly less than zero. The purpose of this is to bias the test slightly in favor of rising runs. Some degree of random noise is present for each ADC sample, which may cause some sample-to-sample differences to become negative during a rise due to a low-energy X-ray. The variable "trig" represents an upper bound to the size of the sample-to-sample differences that should be expected due to random noise, as explained above. So the negative-going difference is required to be larger than some small fraction of "trig" before terminating a rise, it allows X-rays of lower energy to be detected than would be possible if a strictly monotonic rise was required. Also, by requiring a minimum magnitude for the negative difference which terminates a rise, the risk of falsely identifying a pile-up if a valid edge with slower than average rise time is broken in the middle by a negative-going random noise fluctuation is minimized. The energy detection threshold represented by "bigtrig" must be large enough to prevent the number of such false rejections of valid X-rays as pile-up from becoming significant. Empirically, a bigtrig/trig ratio of 5 to 4 and a state-switching threshold of (−trig/8), as used in lines 334 and 344, have been found to work well in combination to achieve a low detection threshold without significant false rejection, but other values may be used without departing from the spirit of the invention.

Line 345 tests for the transition from the "NEG" state 409 to the "POS" state 408. On that transition, if the flag "xraydone" has been set from the "GOING DOWN" state 407 or directly in the "GOING UP" state 404 (FIG. 4A), the "VALID EDGE" state 412 will be entered, which is identical to the "VALID PULSE" state 406. Line 346 saves the current index (time stamp) which will be averaged with the ending time to estimate the final time stamp of a weak edge, for which the maximum "diff" value is not a reliable locator. If the flag "xraydone" is set, line 348 clears it. Line 349 sets a 10-sample inhibit time during which negative values of "diff" are not averaged into the noise estimate for the dynamic computation of noise trigger "trig" as described above. This avoids counting the negative-going recovery period of any overshoot from the edge in the noise estimate.

Line 350 performs the test which allows the present embodiment to outperform prior-art methods by eliminating many patterns which would lead to false triggering by a simple run-height test. FIGS. 6A-6C show sketches of three waveforms for which the rise being tested (from local minimum B to local maximum C) is approximately the same. For simplicity, the rising and falling portions of the waveform have been drawn as straight-line segments, although as noted above the rising segments may contain small negative blips and both rising and falling segments will in general not be straight due to noise fluctuations.

At line 350, the variable "lastval" contains the ADC sample at the point D, the current local minimum. The variable "lastneginf" contains the ADC sample value at point A, the local maximum preceding the rise under test. The rise itself has already been determined to exceed the threshold "bigtrig". The difference from "lastval" (point D in all FIG. 6 sketches) to "lastneginf" (point A in all FIG. 6 traces) is then checked. If that difference is greater than half of noise trigger level "trig", the edge is accepted as valid. The factor of ½ was chosen because of computational convenience and may vary without departing from the scope of the invention. It is desired, however, to have some evidence that the noise band has shifted by a significant fraction of the noise trigger level. Having a reasonably large minimum for D-A also prevents very weak or slow edges which appear as a zig-zag series of up-and-down segments from being falsely detected as separate edges and thereby falsely rejected as pile-up. This check is what enables the detection threshold "bigtrig" for C-B to be only slightly larger than the single-step trigger "trig".

FIG. 6A shows a case where the C-B edge is a recovery from an unusually large negative-going noise excursion. The average of the noise band before and after the edge is the same. Because the D-A difference is actually negative, this rise will be rejected.

FIG. 6C shows a positive-going spike, again with the average noise band unchanged before and afterward. Again, the D-A test fails and the edge is ignored.

FIG. 6B illustrates a successful edge detection. The noise band after the edge under test has shifted significantly from its peak-to-peak range before the edge, and the D-A difference is just above half the single-step noise trigger level "trig", so the edge detection is accepted as valid.

It will be clear to those of ordinary skill in the art that more of the local minima and maxima preceding and following the edge under test could be used in an analogous fashion to verify that the peak-to-peak noise band has actually shifted at the edge under test. It will also be clear that the method of this invention does not depend on any fixed time period, and thus responds dynamically to edges whose rise times vary widely as is the case for the SDD.

Line 351 stores the time stamp of the edge (produces the 'E' signal from the fast pile-up 105 or the slow pile-up 106 logic in FIG. 1). Line 352 maintains the accumulated height of the positive run. Line 353 sets flag "clearneg" to enter the "CLR NEG" state 411 in FIG. 4B. This line could also be inside the "if not posrun" logic block and only executed once per transition.

Line 354 is the start of the logic which handles negative runs. Although the height of the negative run is maintained by line 358, it is not presently used. The D-A difference check has been found to be adequate to detect valid edges.

Lines 355-357 detect the occurrence of a local maximum and maintain the current (point C) and previous (point A) maxima. Line 359 sets flag "clearpos" to force entry to the "CLR POS" state 410, although performing this function inside the "if not negrun" block would be equivalent.

The states represented in FIG. 4A are handled by lines 360-417. It should be noted that the "elif" construction in the Python programming language makes the states mutually exclusive, so the first of the "if . . . elif . . . elif" test chain starting with line 360 whose condition is satisfied will be executed. Thus, the states are presented in reverse order in the code of FIG. 3A-3D as compared to their chronological progress in FIG. 4.

Lines 360-369 show the processing when the system is in the "GOING DOWN" state 407 of FIG. 4. This is the last active state before returning to the main loop. It has two possible exit paths: direct detection of a pile-up during a continuous rise (the "PILEUP" state 405) or going to a later pulse validity check in the "VALID PULSE?" state 406.

In the "GOING DOWN" state 407, line 361 tests whether the current sample-to-sample difference has dropped below the noise trigger level 'trig'. If so, the rate of change of the preamplifier signal is now within the noise band, so the "GOING DOWN" state 407 is exited in lines 362-363 and the flag "xraydone" is set which results in the "VALID PULSE?" state 406 in FIG. 4A being entered, which is also the "VALID EDGE?" state 412 in FIG. 4B.

Line 364 makes the critical check which determines whether a direct pile-up is detected. In the embodiment provided in FIG. 3A-3D, an important feature is that the current difference "diff" must exceed the previous difference "lastdiff" by more than the noise trigger level 'trig'. If the test were not conditioned on 'trig', it would be possible to get valid X-rays falsely identified as pile-up, as follows. Noting that SDD rise times can vary widely, consider a relatively slow rise time in which three successive differences are near the center of the rise and of similar slope. Since noise adds a small random displacement to each sample value, it would be possible for the middle difference to fall slightly relative to the immediately preceding and following differences, leading to a false pile-up signal if successive differences were not required to exceed a noise level.

FIGS. 7A and 7B show two plots of actual waveforms from an SDD. The horizontal axis scale is 10 nS (sampling times of a 100 Mhz ADC) per unit; the numbers are indexes (time stamps) in a file of 256 k samples, of 2.62 milliseconds of real time. The vertical scale is in least significant bits of the ADC, labeled "adu" for ADC units. For both plots, the vertical scale is 100 adu per division.

FIG. 7A shows a smooth but comparatively slow rise from a single X-ray whose drift path in the SDD is longer than average. The boxed area covers 7 samples, or 70 nS. Note also the peak-to-peak noise excursion of about 30 adu just preceding the boxed area. If one were to imagine a similar 30 adu displacement upward in the data point at time 74440, this might make the difference between sample 74441 and sample 74440 less than the differences between either samples 74440 and 74439 or samples 74442 and 74441, matching the pattern of pile-up but due entirely to noise.

FIG. 7B shows a pulse successfully detected as pile-up, despite its total rise time and amplitude being quite similar to the valid pulse of FIG. 7A, implying that the rise times of the individual X-rays must be considerably shorter. The slope in the center boxed region is significantly lower than the slope in the lower-left boxed region, causing processing to move from the "GOING UP" state 404 to the "GOING DOWN" state 407 in FIG. 4. Then, the increase in slope in the upper-right boxed region from 73 adu/sample to 142 adu/sample, or 69 adu, is more than twice the 30-adu sample-to-sample noise fluctuation seen in FIG. 7A and thus highly unlikely to be due to noise. Prior-art methods would be unable to distinguish one of these two pulses as piled up and the other as valid. It should be noted, in particular, that the centers (points of maximum slope) of the two piled-up X-rays in FIG. 7B are separated by 50 nS, less that the total rise time of FIG. 7A.

Lines 364 to 369 of FIG. 3C handle the housekeeping of storing the time stamp of the pile-up, or generating the 'P' signal from the fast pile-up logic 105 or the slow pile-up logic 106, and changing the state variables back to the "GOING UP" state 404.

Lines 370-381 of FIG. 3C handle processing of the "GOING UP" state 404. The variable "maxdiff" holds the current maximum single-sample difference (instantaneous slope) encountered during the current rising sigmoid preamplifier edge. Lines 371-373 maintain this maximum and keep the time stamp associated with the edge pointing to the maximum.

There are two possible exit paths from the "GOING UP" state 404, only one of which (the latter one described below) is relevant to the present invention. Lines 374-376 exit to the "VALID PULSE?" state 406 if the current slope (singlesample difference) drops below half the noise trigger level. No single-step pile-up check is performed. The "xraydone" flag is set, which as described above means that on the next transition from the "NEG" state 409 to the "POS" state 408. The D-A validity check described in connection with FIGS. 6A-6C will be performed.

Lines 377-379 are the other part of the pair of tests which implement the present invention (and the second exit path). This part of the test determines when the state will change from the "GOING UP" state 404 to the "GOING DOWN" state 407. In this test, the decline in single-step slope from the maximum encountered during the rise must be greater than the noise trigger 'trig'. Note that line 374 implies that this exit path cannot be reached unless we have had a maximum difference of at least 1.5 times 'trig', otherwise the first exit path (described above) will be taken. The only way to reach the "GOING DOWN" state 407, and hence enable the possibility of a pile-up detection according to the present invention, is to first satisfy the condition. The exact factor 1.5 is not critical, although it is computationally convenient. The point is that only comparatively high-energy X-rays are suitable candidates for these tests without a risk of false positives, as discussed above. Low energy X-rays may present the same pattern but not be true pile-ups. The specimen from which the waveforms of FIGS. 7A and 7B were captured is a Ni—Al alloy. The X-ray shown in FIG. 7A is probably a Nickel K-alpha near 7500 eV; the two X-rays in FIG. 7B are probably Ni K-alpha and Aluminum K-alpha near 1500 eV.

Lines 378 and 379 handle the change of state from the "GOING UP" state 404 to the "GOING DOWN" state 407. Lines 380-381 do nothing if neither exit path condition is satisfied but the current difference is not a new maximum.

Line 382 is the test which triggers entry into the "GOING UP" state 404 from the "IDLE" state 402. Two conditions must be satisfied. First, the current difference must exceed the noise trigger level 'trig'. The second test ensures that the higher ADC sample of the pair exceeds the previous local maximum. This is not essential, but improves performance by eliminating false triggers on the recovery from negative-going noise spikes.

Lines 383-385 initialize the "GOING UP" state 404 and set the maximum difference to the current difference. Note in particular that this means "maxdiff" may never be less that noise trigger level 'trig' after its first use.

Lines 386-389 trigger the "GOING UP WEAK" state 403. This causes entry to the "GOING UP" state 404 if the cumulative height of a positive run (as described elsewhere herein) exceeds "bigtrig", without requiring that a single-step difference be greater than noise trigger 'trig'. The important line for the present invention is line 389, which resets "maxdiff" equal to noise trigger 'trig'. This is what prevents the "GOING UP" state 404 from entering the "GOING DOWN" state 407, thus possibly enabling a pile-up detection according to the present invention, unless the single-step difference is shown to exceed 'trig' by satisfying the test in line 371 with "maxdiff" equal to 'trig'. In this way, the continuous-runs embodiment and the single-step triggered embodiment described herein are prevented from interfering with one another.

Lines 390-400 detect the occurrence of a reset in the preamplifier 101. This causes the output to drop rapidly, such that the negative single-sample difference exceeds 10 times the trigger level 'trig'. Lines 391-393 inhibit processing during the reset and for a specified period afterward. Lines 394-400 re-initialize the state variables.

Lines 404-414 maintain a 16-entry running sum of the negative single-sample differences in the ADC data, excluding specified time periods near resets or detected edges, as a means of dynamically estimating the noise similar to the method taught in U.S. Pat. No. 5,393,982 to Mott. Specifically, the negative and positive excursions should be statistically equal in the absence of resets and edges from X-rays, but the average of positive excursions may be biased upward by undetected very low energy X-rays.

Lines 415 and 416 walk in parallel through all samples in the captured waveform from the preamplifier 101. In the FPGA embodiment, there is no need to handle boundary conditions at the beginning and end of file segments because the processing loop operates continuously in real time, initialized only on power-up.

Figure 8:
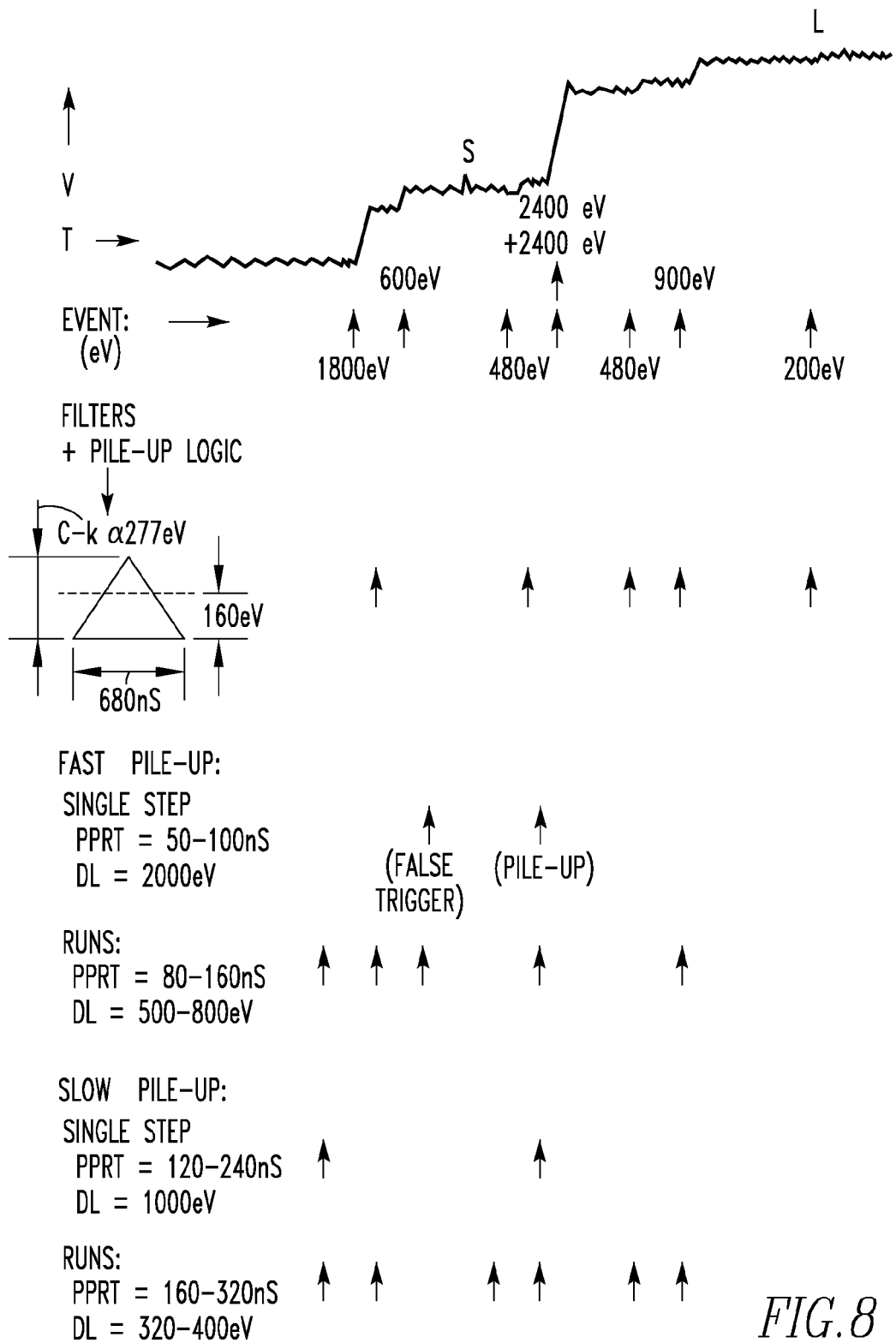
FIG. 8 is a schematic diagram which summarizes the expected pile-up performance of the system of FIG. 1 with typical pulse-pair resolving times and energy detection thresholds for a particular SDD.

FIG. 8 summarizes the expected pile-up performance of the overall system with typical pulse-pair resolving times and energy detection thresholds for an SDD with the following characteristics: (i) active area of approximately 10 square millimeters, and (ii) the first field-effect transistor (FET) stage of the preamplifier 101 incorporated in lithography on the sensor as described by P. Lechner et al., "Silicon drift detectors for high resolution room temperature X-ray spectroscopy", Nucl. Instr. and Meth. 1996; A 377, pp. 346-351. The specific numbers cited are not universal, but will vary with different detector types and configurations. However, they are a reasonably representative of actual performance measured on a small sample of detectors.

The upper waveform trace is an idealized representation of a waveform segment from the preamplifier 101, illustrating several pile-up situations. At the far right is an expanded view of a very low-energy X-ray step. Arrows show the location of the various steps. The very large step is a close pile-up within the rise-time range of steps from a single X-ray as illustrated in FIG. 7B, which can only be detected by the method of the present invention.

Below that, in order, are the expected detection signals from the various pile-up and edge detection logic blocks, with their expected range of pulse-pair resolving times and energy thresholds. The peak detect filter 107 will detect all edges except the spike at time 'S', which is falsely reported by the fast pile-up logic 105 but rejected because there the output of the peak detect filter 107 is not above threshold. Its best resolving time for very low-energy X-rays might be around 350-400 nS for a minimum detectable energy of 200 eV. If a lower detection threshold is required, say for Boron at 185 eV or even Beryllium at 109 eV, the integration time would need to be longer and the resolving time would increase substantially. However, it detects the very low-energy X-ray at the far right which is missed by all other logic blocks.

The fast pile-up logic 105 has a best resolving time of 50 to 100 nS depending on the rise time of the detector. The single-step method of described herein is effective above about 2.5 keV energy, while the continuous-run method described herein can reach 600-900 eV or so. It misses the low-energy X-ray at time 'L'.

The slow pile-up 106, identical to the fast pile-up logic 105 but operating at a lower effective rate on data averaged in the filter averager 104, successfully detects the moderately low-energy X-ray of 1800 eV but has a best resolving time roughly twice as long, 80-200 nS. Its single-step method can detect X-rays down to just under 2 keV, and its continuous-run method is capable of detecting Oxygen X-rays at 500 eV with good efficiency.

Overall, these results are roughly 2 to as much as 5 times better than the resolving times exhibited by existing systems using prior art methods, depending on the energy pair under consideration.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of detecting a pileup from an output signal of a preamplifier of an energy-dispersive radiation spectrometry system, wherein a filter of said energy-dispersive radiation spectrometry system generates a first pulse in response to said output signal, said energy-dispersive radiation spectrometry system having one or more fast channels, wherein each of said fast channels has an associated energy of full efficiency that depends on a threshold energy associated with the fast channel wherein substantially all photons received by said energy-dispersive radiation spectrometry system having at least said associated energy of full efficiency are detected by the fast channel, the method comprising:

measuring an above threshold time duration, said above threshold time duration being a time during which said first pulse is above a minimum detectable threshold energy of said filter;

determining that at least one of said one or more fast channels has not made any detections while said first pulse is above said minimum detectable threshold energy of said filter;

in response to said determining, declaring a pileup if said above threshold time duration exceeds a longest expected pulse duration, said longest expected pulse duration being a duration of a second pulse that would be output by said filter in response to a single photon being received by said energy-dispersive radiation spectrometry system, wherein said single photon has an energy equal to the associated energy of full efficiency of the particular one of the one or more fast channels which have not made any detections that has the lowest threshold energy.

2. The method according to claim 1, further comprising computing said longest expected pulse duration.

3. The method according to claim 1, wherein said one or more fast channels comprise a plurality of fast channels.

4. A pulse processor adapted to perform the method according to claim 1.

5. The method according to claim 1, wherein said energy-dispersive radiation spectrometry system is an X-ray spectrometry system and wherein said photons are X-rays.

6. The method according to claim 1, wherein said energy-dispersive radiation spectrometry system is a gamma-ray spectrometry system and wherein said photons are gamma-rays.

7. An energy-dispersive radiation spectrometry system, comprising:

a detector for converting an incoming photon into an output comprising a current pulse;

a preamplifier for converting the output of said detector into a preamplifier output signal comprising a voltage signal; and a pulse processor having a filter that generates a first pulse in response to said preamplifier output signal, and one or more fast channels, wherein each of said fast channels has an associated energy of full efficiency that depends on a threshold energy associated with the fast channel wherein substantially all photons received by said energy-dispersive radiation spectrometry system having at least said associated energy of full efficiency are detected by the fast channel, said pulse processor being adapted to:

measure an above threshold time duration, said above threshold time duration being a time during which said first pulse is above a minimum detectable threshold energy of said filter;

determine that at least one of said one or more fast channels has not made any detections while said first pulse is above said minimum detectable threshold energy of said filter;

in response to determining that said one or more fast channels have not made any detections, declare a pileup if said above threshold time duration exceeds a longest expected pulse duration, said longest expected pulse duration being a duration of a second pulse that would be output by said filter in response to a single photon being received by said energy-dispersive radiation spectrometry system, wherein said single photon has an energy equal to the associated energy of full efficiency of the particular one of the one or more fast channels which have not made any detections that has the lowest threshold energy.

8. The energy-dispersive radiation spectrometry system according to claim 7, wherein said pulse processor is further adapted to compute said longest expected pulse duration.

9. The energy-dispersive radiation spectrometry system according to claim 7, wherein said one or more fast channels comprise a plurality of fast channels.

10. The energy-dispersive radiation spectrometry system according to claim 7, wherein said energy-dispersive radiation spectrometry system is an X-ray spectrometry system and wherein said photons are X-rays.

11. The energy-dispersive radiation spectrometry system according to claim 7, wherein said energy-dispersive radiation spectrometry system is a gamma-ray spectrometry system and wherein said photons are gamma-rays.

12. A method of detecting a pileup from an output signal of a preamplifier of an energy-dispersive radiation spectrometry system, wherein a filter of said energy-dispersive radiation spectrometry system generates a first pulse in response to said output signal, said energy-dispersive radiation spectrometry system having a fast channel having an energy of full efficiency wherein substantially all photons received by said energy-dispersive radiation spectrometry system having at least said energy of full efficiency are detected by the fast channel, the method comprising:

computing a detected energy from said first pulse, said detected energy being represented by a maximum of said first pulse;

comparing said detected energy to said energy of full efficiency; and declaring a pileup if it is determined that (i) said detected energy exceeds said energy of full efficiency and (ii) said fast channel has not made any detections.

13. The method according to claim 12, further comprising an additional fast channel having an additional energy of full efficiency wherein substantially all photons received by said energy-dispersive radiation spectrometry system having at least said additional energy of full efficiency are detected by the additional fast channel, wherein the method further comprises comparing said detected energy to said additional energy of full efficiency and declaring a pileup if it is determined that (i) said detected energy exceeds said additional energy of full efficiency and (ii) said additional fast channel has not made any detections.

14. A pulse processor adapted to perform the method according to claim 12.

15. The method according to claim 12, wherein said energy-dispersive radiation spectrometry system is an X-ray spectrometry system and wherein said photons are X-rays.

16. The method according to claim 12, wherein said energy- dispersive radiation spectrometry system is a gamma-ray spectrometry system and wherein said photons are gamma-rays.

17. An energy-dispersive radiation spectrometry system, comprising:

a detector for converting an incoming photon into an output comprising a current pulse;

a preamplifier for converting the output of said detector into a preamplifier output signal comprising a voltage signal; and a pulse processor having a filter that generates a first pulse in response to said preamplifier output signal, and a fast channel having an energy of full efficiency wherein substantially all photons received by said energy-dispersive radiation spectrometry system having at least said energy of full efficiency are detected said fast channel, said pulse processor being adapted to:

compute a detected energy from said first pulse, said detected energy being represented by a maximum of said first pulse;

compare said detected energy to said energy of full efficiency; and declare a pileup if it is determined that (i) said detected energy exceeds said energy of full efficiency and (ii) said fast channel has not made any detections.

18. The energy-dispersive radiation spectrometry system according to claim 17, said pulse processor further comprising an additional fast channel having an additional energy of full efficiency wherein substantially all photons received by said energy-dispersive radiation spectrometry system having at least said additional energy of full efficiency are detected by the additional fast channel, wherein the pulse processor is further adapted to compare said detected energy to said additional energy of full efficiency and declare a pileup if it is determined that (i) said detected energy exceeds said additional energy of full efficiency and (ii) said additional fast channel has not made any detections.

19. The energy-dispersive radiation spectrometry system according to claim 17, wherein said energy-dispersive radiation spectrometry system is an X-ray spectrometry system and wherein said photons are X-rays.

20. The energy-dispersive radiation spectrometry system according to claim 17, wherein said energy-dispersive radiation spectrometry system is a gamma-ray spectrometry system and wherein said photons are gamma-rays.

* * * * *

UNITED STATES PATENT AND TRADEMARK OFFICE
CERTIFICATE OF CORRECTION

PATENT NO.        : 7,807,973 B2
APPLICATION NO.   : 12/184721
DATED             : October 5, 2010
INVENTOR(S)       : Richard B. Mott It is certified that error appears in the above-identified patent and that said Letters Patent is hereby corrected as shown below:

Column 2, line 17, "such as case" should read --such a case--.
Column 3, line 17, "them be" should read --them to be--.
Column 6, line 24, "description, invention" should read --description, the invention--.
Column 9, line 19, "less noisy" should read --less noise--.
Column 10, line 27, "fast pile-up logic 105" should read --fast pile-up logic 104--.
Column 11, line 17, "fast pile-up logic 105" should read --fast pile-up logic 104--.
Column 11, line 21, "fast pile-up logic 105" should read --fast pile-up logic 104--.
Column 11, line 25, "fast pile-up logic 105" should read --fast pile-up logic 104--.
Column 11, line 35, "fast pile-up logic 105" should read --fast pile-up logic 104--.
Column 13, line 25, "fast pile-up logic 105" should read --fast pile-up logic 104--.
Column 13, line 33, "fast pile-up logic 105" should read --fast pile-up logic 104--.
Column 13, line 34, "fast pile-up logic 105" should read --fast pile-up logic 104--.
Column 13, line 60, "fast pile-up logic 105" should read --fast pile-up logic 104--.
Column 13, line 62, "fast pile-up logic 105" should read --fast pile-up logic 104--.
Column 13, line 65, "fast pile-up logic 105" should read --fast pile-up logic 104--.
Column 14, line 22, "105" should read --104--.
Column 14, line 26, "filter averager 104" should read --filter averager 105--.
Column 14, line 30, "filter averager 104" should read --filter averager 105--.
Column 14, line 33, "105" should read --104--.
Column 14, line 43, "FIG." should read --FIGS.--.
Column 14, line 60, "104" should read --105--.
Column 15, line 6, "fast pile-up logic 105" should read --fast pile-up logic 104--.
Column 15, line 12, "fast pile-up logic 105" should read --fast pile-up logic 104--.
Column 15, line 25, "3A-3d" should read --3A-3D--.
Column 15, line 38, "FIG." should read --FIGS.--.
Column 15, line 38, "shall" should read --show--.
Column 15, line 39, "stops" should read --stop--.
Column 15, line 40, first instance, "starts" should read --start--.
Column 15, line 40, "stops" should read --stop--.

Signed and Sealed this
Seventeenth Day of July, 2012

David J. Kappos
*Director of the United States Patent and Trademark Office*

CERTIFICATE OF CORRECTION (continued)
U.S. Pat. No. 7,807,973 B2

Column 15, line 40, second instance, "starts" should read --start--.
Column 15, line 43, "3A-3d" should read --3A-3D--.
Column 15, line 43, "fast pile-up logic 105" should read --fast pile-up logic 104--.
Column 15, line 45, "filter averager 104" should read --filter averager 105--.
Column 15, line 67, "by on embodiment" should read --by one embodiment--.
Column 16, line 3, "fast pile-up logic 105" should read --fast pile-up logic 104--.
Column 16, line 5, "fast pile-up logic 105" should read --fast pile-up logic 104--.
Column 16, line 10, "Plse validation logic" should read --pulse validation logic--.
Column 16, line 50, "alocal" should read --a local--.
Column 18, line 48, "fast pile-up logic 105" should read --fast pile-up logic 104--.
Column 19, line 2, "FIG." should read --FIGS.--.
Column 19, line 19, "FIG." should read --FIGS.--.
Column 19, line 62, "less that" should read --less than--.
Column 20, line 51, "less that" should read --less than--.
Column 21, line 32, "are a" should read --are--.
Column 21, line 46, "fast pile-up logic 105" should read --fast pile-up logic 104--.
Column 21, line 54, "fast pile-up logic 105" should read --fast pile-up logic 104--.
Column 21, line 56, "method of described" should read --method described--.
Column 21, line 60, "fast pile-up logic 105" should read --fast pile-up logic 104--.
Column 21, line 62, "filter averager 104" should read --filter averager 105--.
Column 23, line 50, "energy- dispersive" should read --energy-dispersive--.
Column 24, line 16, "energy- dispersive" should read --energy-dispersive--.
Column 24, line 31, "are detected said fast channel" should read --are detected by said fast channel--.